US011986904B2

(12) United States Patent
Dehoff et al.

(10) Patent No.: US 11,986,904 B2
(45) Date of Patent: May 21, 2024

(54) ALUMINUM-CERIUM-NICKEL ALLOYS FOR ADDITIVE MANUFACTURING

(71) Applicants: Ryan R. Dehoff, Knoxville, TN (US); Hunter B. Henderson, Livermore, CA (US); Scott McCall, Livermore, CA (US); Richard Michi, Knoxville, TN (US); Peeyush Nandwana, Oak Ridge, TN (US); Ryan Ott, Ames, IA (US); Alexander J. Plotkowski, Knoxville, TN (US); Orlando Rios, Knoxville, TN (US); Amit Shyam, Knoxville, TN (US); Zachary C. Sims, Knoxville, TN (US); Kevin D. Sisco, Knoxville, TN (US); David Weiss, Manitowoc, WI (US); Ying Yang, Knoxville, TN (US)

(72) Inventors: Ryan R. Dehoff, Knoxville, TN (US); Hunter B. Henderson, Livermore, CA (US); Scott McCall, Livermore, CA (US); Richard Michi, Knoxville, TN (US); Peeyush Nandwana, Oak Ridge, TN (US); Ryan Ott, Ames, IA (US); Alexander J. Plotkowski, Knoxville, TN (US); Orlando Rios, Knoxville, TN (US); Amit Shyam, Knoxville, TN (US); Zachary C. Sims, Knoxville, TN (US); Kevin D. Sisco, Knoxville, TN (US); David Weiss, Manitowoc, WI (US); Ying Yang, Knoxville, TN (US)

(73) Assignees: UT-Battelle, LLC, Oak Ridge, TN (US); University of Tennessee Research Foundation, Knoxville, TN (US); Iowa State University Research Foundation, Inc., Ames, IA (US)

( * ) Notice: Subject to any disclaimer, the term of this patent is extended or adjusted under 35 U.S.C. 154(b) by 114 days.

(21) Appl. No.: 17/084,582

(22) Filed: Oct. 29, 2020

(65) Prior Publication Data

US 2021/0129270 A1 May 6, 2021

Related U.S. Application Data

(60) Provisional application No. 62/927,884, filed on Oct. 30, 2019.

(51) Int. Cl.
*C22C 21/00* (2006.01)
*B23K 26/342* (2014.01)
(Continued)

(52) U.S. Cl.
CPC ............ *B23K 26/342* (2015.10); *B33Y 10/00* (2014.12); *B33Y 70/00* (2014.12); *B33Y 70/10* (2020.01);
(Continued)

(58) Field of Classification Search
CPC .................. B22F 10/28; B22F 2998/10; B22F 2301/052; B23K 2103/10; C22C 1/0416; C22C 21/00; Y02P 10/25
(Continued)

(56) References Cited

U.S. PATENT DOCUMENTS

| 1,960,916 A | 5/1934 | Murphey et al. |
| 2,656,270 A | 10/1953 | Russel |

(Continued)

FOREIGN PATENT DOCUMENTS

| CN | 104004947 A | 8/2014 |
| CN | 104711464 A | 6/2015 |

(Continued)

OTHER PUBLICATIONS

NPL: on-line translation of JP-06184712-A, Jul. 1994 (Year: 1994).*
(Continued)

*Primary Examiner* — Jie Yang
(74) *Attorney, Agent, or Firm* — Klarquist Sparkman, LLP

(57) ABSTRACT

Disclosed herein are embodiments of an Al—Ce—Ni alloy for use in additive manufacturing. The disclosed alloy embodiments provide fabricated objects, such as bulk components, comprising a heterogeneous microstructure and
(Continued)

having good mechanical properties even when exposed to conditions used during the additive manufacturing process. Methods for making and using alloy embodiments also are disclosed herein.

15 Claims, 10 Drawing Sheets

(51) Int. Cl.
*B33Y 10/00* (2015.01)
*B33Y 70/00* (2020.01)
*B33Y 70/10* (2020.01)
*B22F 9/08* (2006.01)
*B23K 103/10* (2006.01)

(52) U.S. Cl.
CPC ...... *C22C 21/00* (2013.01); *B22F 2009/0824* (2013.01); *B22F 2301/052* (2013.01); *B22F 2304/10* (2013.01); *B23K 2103/10* (2018.08)

(58) Field of Classification Search
USPC ........................................... 420/545
See application file for complete search history.

(56) References Cited

U.S. PATENT DOCUMENTS

| | | | |
|---|---|---|---|
| 3,252,841 | A | 5/1966 | Foerster |
| 4,379,719 | A | 4/1983 | Hildeman et al. |
| 4,464,199 | A | 8/1984 | Hildeman et al. |
| 4,787,943 | A | 11/1988 | Mahajan et al. |
| 4,915,869 | A | 4/1990 | Aubert et al. |
| 4,950,452 | A | 8/1990 | Masumoto et al. |
| 5,037,608 | A | 8/1991 | Tarcy et al. |
| 5,074,935 | A | 12/1991 | Masumoto et al. |
| 5,154,780 | A | 10/1992 | Premkumar |
| 5,264,021 | A | 11/1993 | Kita et al. |
| 5,318,642 | A | 6/1994 | Kita |
| 5,320,688 | A | 6/1994 | Masumoto et al. |
| 5,431,751 | A | 7/1995 | Okochi et al. |
| 5,578,144 | A | 11/1996 | Satou et al. |
| 5,647,919 | A | 7/1997 | Kita |
| 5,900,210 | A | 5/1999 | Buckler |
| 6,231,808 | B1 | 5/2001 | Hashikura |
| 6,248,453 | B1 | 6/2001 | Watson |
| 7,811,395 | B2 | 10/2010 | Pandey |
| 9,079,211 | B1 | 7/2015 | Deshpande et al. |
| 9,394,596 | B2 | 7/2016 | Kramer et al. |
| 9,963,770 | B2 | 5/2018 | Rios et al. |
| 2003/0183306 | A1 | 10/2003 | Hehmann et al. |
| 2004/0156739 | A1 | 8/2004 | Song |
| 2004/0238150 | A1 | 12/2004 | Adachi et al. |
| 2005/0199318 | A1 | 9/2005 | Doty |
| 2005/0271543 | A1 | 12/2005 | Pfannen-Mueller et al. |
| 2008/0219882 | A1 | 9/2008 | Woydt |
| 2009/0263266 | A1 | 10/2009 | Pandey |
| 2009/0288796 | A1 | 11/2009 | Song et al. |
| 2010/0226817 | A1 | 9/2010 | Pandey |
| 2010/0282428 | A1 | 11/2010 | Pandey |
| 2012/0058353 | A1 | 3/2012 | Komiyama et al. |
| 2012/0152414 | A1 | 6/2012 | Che et al. |
| 2013/0312876 | A1 | 11/2013 | Palm |
| 2014/0326368 | A1 | 11/2014 | Okamoto |
| 2015/0135897 | A1 | 5/2015 | Sutcliffe et al. |
| 2016/0053346 | A1 | 2/2016 | Szuromi et al. |
| 2017/0096730 | A1 | 4/2017 | Rios et al. |
| 2018/0237893 | A1 | 8/2018 | Rios et al. |
| 2018/0291489 | A1 | 10/2018 | Mann et al. |
| 2019/0085431 | A1 | 3/2019 | Rios et al. |
| 2021/0032727 | A1* | 2/2021 | Chehab ............ C22F 1/00 |
| 2021/0276099 | A1* | 9/2021 | Chehab ............ B22F 10/25 |

FOREIGN PATENT DOCUMENTS

| | | | |
|---|---|---|---|
| CN | 109797326 | | 5/2019 |
| DE | 10 2011 111365 | | 2/2013 |
| JP | 06184712 | A * | 7/1994 |
| JP | H07 268597 | | 10/1995 |
| JP | 3392509 | | 3/2003 |
| WO | WO 2002/086175 | | 10/2002 |
| WO | WO 2011/035653 | | 3/2011 |
| WO | WO 2017/007908 | | 1/2017 |
| WO | WO 2018/119283 | | 6/2018 |
| WO | WO 2018/156651 | | 8/2018 |
| WO | WO-2019155180 | A1 * | 8/2019 ............ B22F 10/20 |

OTHER PUBLICATIONS

Abbas, "Effect of high power diode laser surface melting on wear resistance of magnesium alloys," *Wear*, vol. 260, pp. 175-180, May 10, 2005.

Audebert et al., "Production of glassy metallic layers by laser surface treatment," *Scripta Materialia*, 48(3):281-286, Feb. 2003.

Chen et al., "Mechanical Properties of Nanometric Al2O3 Particulate-Reinforced Al-Al11Ce3 Composites Produced by Friction Stir Processing," *Materials Transactions*, 51(5):933-938, Apr. 7, 2010.

Davis, "Aluminum and Aluminum Alloys," *ASM International*, pp. 1-2, 18, and 309-310 (1993).

Debroy et al., "Additive Manufacturing of Metallic Components—Process, Structure and Properties," *Progress in Materials Science*, vol. 92, pp. 112-224 (2018).

Dudas et al., "Preventing Weld Cracks in High-Strength Aluminum Alloys," *Weld. Res.*, vol. 45, pp. 241-249 (Jun. 1966).

Eskin et al., "A Quest for a New Hot Tearing Criterion," *Metall. Mater. Trans. A Phys. Metall. Mater. Sci.*, vol. 38A, pp. 1511-1519 (Jul. 2007).

Fodran, "Microstructural Evolution and Thermal Stability of AL-CE-NI Ternary Eutectic," Thesis, Graduate School of the University of Florida (2002).

Frazier, "Metal Additive Manufacturing: A Review," *J. Mater. Eng. Perform.*, vol. 23(6), pp. 1917-1928 (Jun. 2014).

Graham et al., "Coarsening of Eutectic Microstructures at Elevated Temperatures," *Transactions of the Metallurgical Society of AIME*, vol. 236, pp. 94-102, Jan. 1966.

International Search Report and Written Opinion issued for International Application No. PCT/US2016/41293 dated Nov. 17, 2016.

International Search Report and Written Opinion issued for International Application No. PCT/US2017/042208 dated Oct. 20, 2017.

International Search Report and Written Opinion issued for International Application No. PCT/US2017/042203 dated Oct. 20, 2017.

Jun et al., "Characterization and wear resistance of laser surface melting AZ91 D alloy," *Journal of Alloys and Compounds*, vol. 455, pp. 142-147, Jan. 16, 2007.

Kou, "A Criterion for Cracking During Solidification," *Acta Mater.*, vol. 88, pp. 366-374 (2015).

Kou, "A Simple Index for Predicting the Susceptibility to Solidification Cracking," *Weld. J.*, vol. 94, pp. 374-388 (Dec. 2015).

Kou, "Welding Metallurgy, Second Edition," *John Wiley & Sons, Inc.*, Hoboken, NJ, 466 pages (2003).

Lewandowski et al., "Metal Additive Manufacturing: A Review of Mechanical Properties," *Annu. Rev. Mater. Res.*, vol. 46, pp. 151-186 (2016).

Lin et al., "Hot-Tear Susceptibility of Aluminum Wrought Alloys and the Effect of Grain Refining," *Metall. Mater. Trans. A Phys. Metall. Mater. Sci.*, vol. 38, pp. 1056-1068 (2007).

Manca et al., "Microstructure and Properties of Novel Heat Resistant Al—Ce—Cu Alloy for Additive Manufacturing," *Metals and Materials International*, 8 pages (Nov. 2018) [available online: https://doi.org/10.1007/s12540-018-00211-0].

Miller et al., "Recent Development in Aluminium Alloys for the Automotive Industry," *Mater. Sci. Eng. A.*, vol. 280, pp. 37-49 (2000).

Phillion et al., "A New Methodology for Measurement of Semi-Solid Constitutive Behavior and its Application to Examination of As-Cast Porosity and Hot Tearing in Aluminum Alloys," pp. 1-24

(56) References Cited

OTHER PUBLICATIONS (also published as Phillion et al., "A New Methodology for Measurement of Semi-Solid Constitutive Behavior and its Application to Examination of As-Cast Porosity and Hot Tearing in Aluminum Alloys," *Mater. Sci. Eng. A.*, vol. 491, pp. 237-247 (2008)).
Plotkowski et al., "Corrigendum to 'Evaluation of an Al—Ce alloy for additive manufacturing,'" [Acta Mater. 126 (2017) 507-519] *Acta Materialia*, vol. 159, pp. 439-441, Aug. 22, 2018.
Plotkowski et al., "Evaluation of an Al—Ce alloy for laser additive manufacturing," *Acta Materialia*, vol. 126, pp. 507-519, Dec. 27, 2016.
Rappaz et al., "A New Hot-Tearing Criterion," *Metall. Mater. Trans. A*, vol. 30A, pp. 449-455 (Feb. 1999).
Sames et al., "The Metallurgy and Processing Science of Metal Additive Manufacturing," pp. 1-76 (also published as Sames et al., "The Metallurgy and Processing Science of Metal Additive Manufacturing," *Int. Mater. Rev.*, vol. 61, pp. 315-360 (2016)).
Sims et al., "Cerium-Based, Intermetallic-Strengthened Aluminum Casting Alloy: High-Volume Co-product Development," *JOM*, 68(7):1940-1947, May 23, 2016.
Sims et al., "Characterization of Near Net-Shape Castable Rare Earth Modified Aluminum Alloys for High Temperature Application," *Light Metals*, ed. Edward Williams, pp. 111-114, 2016.
Tomida et al., "Improvement in wear resistance of hyper-eutectic Al—Si cast alloy by laser surface remelting," *Surface and Coatings Technology*, vol. 169-170, pp. 468-471, 2003.
Trevisan, "On the Selective Laser Melting (SLM) of the AlSi10Mg Alloy: Process, Microstructure, and Mechanical Properties," *Materials*, 10(76):1-23, Jan. 2017.
Yilmaz et al., "The microstructure and mechanical properties of unidirectionally solidified Al-Si alloys," *Journal of Materials Science*, vol. 24, pp. 2065-2070, 1989.
Zhang et al., "Effect of substituting cerium-rich mischmetal with lanthanum on microstructure and mechanical properties of die-cast Mg—Al—Re alloys," *Materials and Design*, vol. 30, pp. 2372-2378, Nov. 7, 2008.
Bakke et al., "Improving the Strength and Ductility of Magnesium Die-Casting Alloys via Rare-Earth Addition," The Journal of the Minerals, Metals & Materials Society, 55(11): 46-51, Nov. 2003.
Cecchinato et al., "Influence of Magnesium Alloy Degradation on Undifferentiated Human Cells," PLOS One, 10(11): 1-18, Nov. 23, 2015.
Czerwinski et al., "On the Al-Al11Ce3 Eutectic Transformation in Aluminum-Cerium Binary Alloyw," J. Materials, 13 (2020).
Fan et al., "Dual characteristic of trace rare earth elements in a commercial casting Al-Cu-X alloy," Rare Metals, 34(5): 308-313, May 2015.
Final Office Action issued for U.S. Appl. No. 16/132,231 on Dec. 27, 2021 (13 pages).
Final Office Action issued for U.S. Appl. No. 16/132,231 on Jan. 25, 2023 (12 pages).
Gallo et al., "Aluminum fluxes and fluxing practices," ASM Handbook, vol. 15, pp. 230-239 (2008).

International Search Report and Written Opinion issued for International Application No. PCT/US2018/051218 on Dec. 21, 2018.
International Search Report and Written Opinion issued for International Application No. PCT/US2018/019046 on Jul. 17, 2018.
Jin et al., "Thermodynamic evaluation and optimization of Al—La, Al—Ce, Al—Pr, Al—Nd and Al—Sm systems using the Modified Quasichemical Model for Liquids," CALPHAD: Computer Coupling of Phase Diagrams and Thermochemistry, 35(1): 30-41, Dec. 14, 2010.
Kang et al., "Critical evaluation and thermodynamic optimization of the Al—Ce, Al—Y, Al—Sc and Mg—Sc binary systems," Computer Coupling of Phase Diagrams and Thermochemistry, 32(2): 413-422, Mar. 27, 2008.
Knipling et al., "Criteria for developing castable, creep-resistant aluminum-based alloys—A review," Z. Metallkd., 97(3):246-265, Mar. 2006.
Li et al., "Corrosion mechanism associated with T1 and T2 precipitates of Al-Cu-Li alloys in NaCl solution", Journal of Alloys and Compounds, 460, pp. 688-693 (2008).
Machine Translation of Su Xiang (CN114438383A), 2022.
Machine Translation of Su Xiang et al. (CN109797326A), 2019.
Machine Translation of Zhou Yamin (CN103509977A), 2014.
Meng et al., "Thermodynamic optimization of the Al—Yb binary system," Journal of Alloys and Compounds, 452(2): 279-282, Dec. 5, 2006.
Non-Final Office Action issued for U.S. Appl. No. 16/132,231 on Jun. 15, 2021, 15 pages.
Non-Final Office Action issued for U.S. Appl. No. 16/132,231 on Jun. 16, 2022 (14 pages).
Prakash et al., The effect of Mg Addition on Microstructure and Tensile and Stress Rupture Properties of a P/M Al—Fe—Ce alloy; Scripta Materialia, vol. 39 (7), pp. 867-872, 1998.
Raghavan, "Al—Ce—Mg (Aluminum-Cerium-Magnesium)," ASM International, pp. 453-455 (2007).
Raghavan, "Al—Cu—Li (Aluminum-Copper-Lithium)", Journal of Phase Equilibria and Diffusion, vol. 31, No. 3, pp. 288-290 (2010).
Riani et al., "Ternary rare-earth aluminum systems with copper: a review and a contribution to their assessment," Journal of Phase Equilibria and Diffusion, 25(1): 22-52, Feb. 2004.
Sims et al., "High performance aluminum-cerium alloys for high-temperature applications," Materials Horizons, 4(6): 1070-1078, Aug. 1, 2017.
Van Dalen et al., "Erbium and ytterbium solubilities and diffusivities in aluminum as determined by nanoscale characterization of precipitates," Acta Materialia, 57(14): 4081-4089, Jun. 6, 2009.
Yao et al. "Effects of La on the age hardening behavior and precipitation kinetics in the cast Al—Cu alloy," Journal of Alloys and Compounds, 540(5): 154-158, Jun. 26, 2012.
Yao et al., "Phase relations in the Cu-poor part of the Ce—Al—Cu system at 503 K," Journal of Alloys and Compounds, 484(1-2): 86-89, Sep. 18, 2009.
Zhang, "Effect of substituting cerium-rich mischmetal with lanthanum on microstructure and mechanical properties of die-cast Mg—Al—Re alloys," Materials and Design, 30(7): 2372-2378, Aug. 2009.

\* cited by examiner

ALUMINUM-CERIUM-NICKEL ALLOYS FOR ADDITIVE MANUFACTURING

CROSS REFERENCE TO RELATED APPLICATION

This application claims the benefit of the earlier filing date of U.S. Provisional Patent Application No. 62/927,884, filed on Oct. 30, 2019; this prior application is incorporated herein by reference in its entirety.

ACKNOWLEDGMENT OF GOVERNMENT SUPPORT

This invention was made with government support under Contract Nos. DE-AC05-00OR22725, DE-AC02-07CH11358, and DE-AC52-07NA27344 awarded by the U.S. Department of Energy. The government has certain rights in the invention.

FIELD

The present disclosure is directed to embodiments of an Al—Ce—Ni-based alloy designed for additive manufacturing, and additive manufacturing method embodiments using the same to provide high-strength products for use in various industrial applications.

PARTIES TO JOINT RESEARCH AGREEMENT

The claimed invention arose under an agreement between UT-Battelle, LLC, University of Tennessee Research Foundation, Iowa State University of Science and Technology, Lawrence Livermore National Laboratory, and Eck Industries, Inc., funded by the Critical Materials Institute of the United States Department of Energy, which agreement was in effect on or before the effective filing date of the claimed invention.

BACKGROUND

Aluminum alloys are being increasingly adopted in transportation, aerospace, and defense applications to replace more dense materials, such as Ti- and Fe-based alloys. Additive manufacturing (AM) offers a route for manufacturing complex designs for further weight savings and improved performance; however, very few existing Al alloys are well suited for AM process conditions. Instead, Al alloys used in the art typically are designed for wrought processing and post-process aging. Such Al alloys, however, tend to exhibit hot-cracking under welding and AM conditions and also exhibit poor high-temperature performance, losing a large fraction of their strength in the range of 250-450° C. There exists a need in the art for Al-based alloy embodiments that can be used in AM methods to prepare bulk alloys and that also exhibit good mechanical strength and other properties at high temperatures.

SUMMARY

Disclosed herein are alloy composition embodiments for additive manufacturing. In one embodiment, the alloy composition, comprises greater than 0 wt % to 35 wt % cerium; greater than 1 wt % to 35 wt % nickel; 0 wt % to 3 wt % manganese; 0 wt % to 3 wt % iron; 0 wt % to 2 wt % magnesium; 0 wt % to 2 wt % zirconium; 0 wt % to 1 wt % silicon; 0 wt % to 5 wt % chromium; a balance of aluminum; and wherein the amount of cerium and amount of nickel present in the alloy composition are sufficient to cause the formation of at least one intermetallic selected from $Al_{23}Ni_6Ce_4$, $Al_{11}Ce_3$, $Al_7Ni_2Ce$, $Al_{20}Mn_2Ce$ or $Al_3Ni$. In an independent embodiment, the alloy composition does not comprise 12 wt % Ce, 13 wt % Ce, or 14 wt % Ce if Ni is present in an amount of 5 wt %, 6 wt %, or 7 wt %.

In additional embodiments, an alloy composition for additive manufacturing is disclosed, comprising: cerium and nickel, wherein the cerium and nickel are independently present in an amount sufficient to provide at least one of an $Al_{23}Ni_6Ce_4$, $Al_{11}Ce_3$, $Al_7Ni_2Ce$, $Al_{20}Mn_2Ce$ or $Al_3Ni$ intermetallic phase in an additively manufactured component; and a balance of aluminum.

Also disclosed are embodiments of a fabricated object comprising the alloy composition as disclosed herein, wherein the fabricated object comprises a heterogeneous microstructure having (i) an aluminum-based matrix phase and (ii) an intermetallic phase, wherein the aluminum-based matrix phase further comprises isolated features with an average length of 50 nm to 50 μm; and the intermetallic phase further comprises lattice-like structures between the aluminum-based matrix features, with a thickness ranging from 10 nm to 100 nm.

Also disclosed are embodiments of a method, comprising (a) combining aluminum with (i) nickel ranging from greater than 1 wt % to 35 wt %, (ii) cerium ranging from greater than 0 wt % to 35 wt % to form an aluminum-based alloy composition; (b) adding a first amount of feedstock comprising the aluminum-based alloy composition to a build platform; (c) exposing the first amount, or a portion thereof, of the feedstock to an energy source to provide a first energy-treated region on the build platform; (d) adding a second amount of the feedstock to the build platform wherein the second amount of the feedstock is positioned immediately adjacent to the first energy-treated region on the build platform; and (e) exposing the second amount, or a portion thereof, of the feedstock to the energy source to provide a second energy-treated region on the build platform.

The foregoing and other objects, features, and advantages of the present disclosure will become more apparent from the following detailed description, which proceeds with reference to the accompanying figures.

BRIEF DESCRIPTION OF THE DRAWINGS

FIG. 1A shows the microstructure of the component in the as-fabricated state; and FIG. 1B shows the microstructure of the component after hot isostatic pressing.

FIG. 5A shows a representative micrograph of the microstructure of a sample fabricated using the Concept Laser M2 LPBF system; FIG. 5B shows a representative micrograph of the microstructure of a sample fabricated using the EOS M290; and FIG. 5C shows a micrograph of the microstructure of the Al—Ce—Ni—Mn alloy fabricated using the EOS M290 and containing Mn-rich precipitate phases.

FIG. 7A shows a region of relatively uniform distribution of matrix and intermetallic features with a first brighter intermetallic phase a second intermetallic phase shown as less bright, rounded particles, and a darker aluminum matrix; and FIG. 7B shows a region of relatively uniform distribution of matrix and intermetallic features.

FIG. 8A shows two isolated regions of the brighter intermetallic phase from FIGS. 7A and 7B within an aluminum matrix feature; FIG. 8B shows an atomic resolution view of one of the intermetallic features of FIG. 8A; and FIG. 8C is an atomic resolution view of one of the intermetallic features of FIG. 8A showing an atomic column spacing of 27 nm.

FIG. 9A shows the secondary intermetallic phase particle against an aluminum matrix region and a first intermetallic phase region; and FIGS. 9B and 9C show an atomic resolution level view of the second intermetallic phase particle.

DETAILED DESCRIPTION

I. Overview of Terms

Figure 1A:
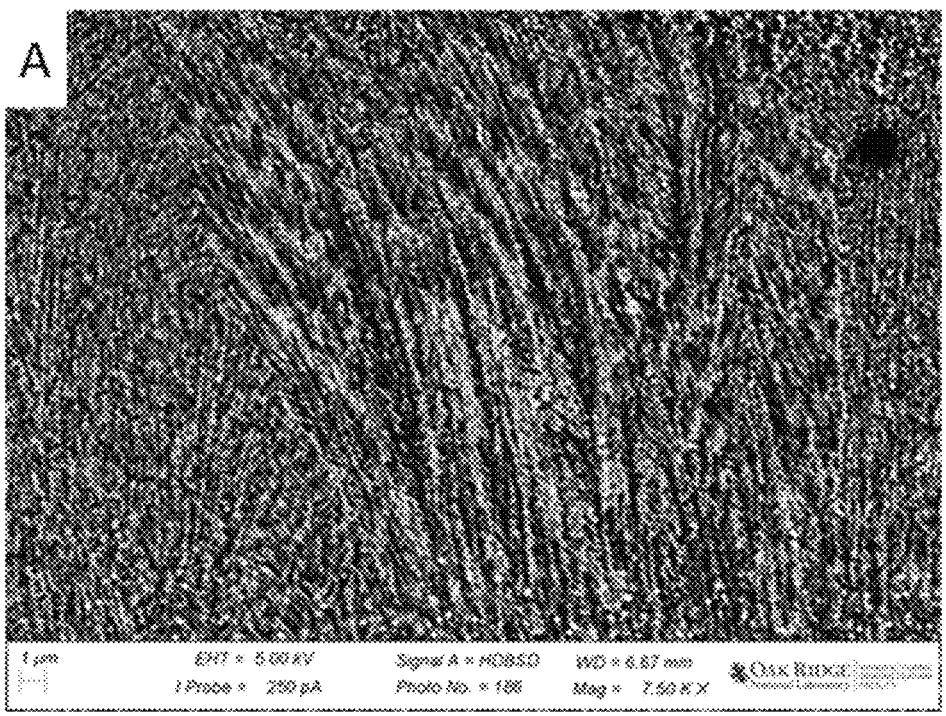
FIGS. 1A and 1B are micrographs of a representative structure of a component fabricated from the Al—Ce—Ni alloys disclosed herein according to the additive manufacturing methods disclosed herein.

The following explanations of terms are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and compounds similar or equivalent to those described herein can be used in the practice or testing of the present disclosure, suitable methods and compounds are described below. The compounds, methods, and examples are illustrative only and not intended to be limiting, unless otherwise indicated. Other features of the disclosure are apparent from the following detailed description and the claims.

Unless otherwise indicated, all numbers expressing quantities of components, molecular weights, percentages, temperatures, times, and so forth, as used in the specification or claims are to be understood as being modified by the term "about." Accordingly, unless otherwise indicated, implicitly or explicitly, the numerical parameters set forth are approximations that can depend on the desired properties sought and/or limits of detection under standard test conditions/methods. When directly and explicitly distinguishing embodiments from discussed prior art, the embodiment numbers are not approximates unless the word "about" is recited. Furthermore, not all alternatives recited herein are equivalents.

The notation "Al-aCe-bNi," (or "AlaCebNi") as used in certain embodiments described herein, indicates the composition of the alloy, where "a" is the percent by weight of the cerium in the alloy and where "b" is the percent by weight of the nickel in the alloy. For example, Al-9Ce-4Ni indicates an alloy of 9 wt % Ce and 4 wt % Ni. As disclosed herein, the Al—Ce—Ni alloy can comprise additional minor alloying elements and/or trace impurities. In such embodiments, such components can be present in trace amounts that do not significantly modify the balance weight % of aluminum, unless expressly stated otherwise. For example, the balance weight percent of the alloy can comprise aluminum and trace impurities at very low levels. In some cases, composition data may be presented in atomic percent, in which case units of at % will be used.

Alloy compositions disclosed herein and items fabricated from those alloy compositions using additive manufacturing processes described herein may, in certain embodiments, have microstructures with a number of irregularly-shaped features. When discussing the size or average size of these features, measurements are described in the direction of the longest axis that may be drawn through the feature. In such embodiments, it is to be understood that a description of the size or average size in the direction of the longest axis places no limitations on the measurements of the aforementioned features in any other direction.

The following terms and definitions are provided:

Adjacent: When used in reference to the position of one or more layers making up a fabricated object made using an additive manufacturing process, this term refers to a physical orientation (or ordering) of a reference layer (e.g., a first layer of a feedstock that is provided and subjected to the energy source used in the additive manufacturing process) and another layer (e.g., a subsequent layer of a feedstock that is provided and subjected the energy source used in the additive manufacturing process) wherein the reference layer and the other layer are physically associated through one or more intervening layers (e.g., one or more layers of a feedstock that are provided and subject to the energy source used in the additive manufacturing process).

Alloy: A solid or liquid mixture of two or more metals, or of one or more metals with certain metalloid elements.

Aluminum Matrix: The primary aluminum phase in an alloy embodiment, such as the alloy phase having aluminum atoms arranged in a face-centered cubic structure, optionally with other elements in solution in the aluminum structure.

Cellular Feature: When used in reference to the microstructure of an alloy, a cellular feature is a microstructural region of a particular chemistry that is completely enclosed by a region of different chemistry.

Cellular Microstructure: When used in reference to the disposition of one or more phases in the microstructure, this term refers to a microstructure having a plurality of cellular features isolated by regions of differing chemistry.

Dendrite: A characteristic tree-like structure of crystals that grows as molten metal solidifies.

Eutectic Structure/Composition: A homogeneous solid structure formed when multiple solid phases grow together in a cooperative manner from a liquid or molten material. For binary materials, a super lattice is formed having a unique molar ratio between the two alloying elements. At this molar ratio, the mixtures melt as a whole at a specific temperature—the eutectic temperature. At other molar ratios for the binary material, one component of the mixture will melt at a first temperature and the other component(s) will melt at a different (e.g., higher) temperature.

Fabricated Object: An object (e.g., a component or a layer) formed during an additive manufacturing process, wherein a feedstock (e.g., a feedstock powder) is exposed to an energy source to form a shape (e.g., a consolidated pre-defined shape). Any particular shape is contemplated herein, but when the object is "fabricated," the object is intended to be different (e.g., in terms of exhibited properties, or in terms of form, and/or intermetallic composition) from the feedstock (or feedstock powder) used to prepare the fabricated object.

Feedstock (or Feedstock Powder): In some embodiments, this term refers to an alloy composition as described herein (wherein the alloying metals or metal precursors are pre-mixed and/or provided by an atomized alloy ingot) that is used to form a layer of a fabricated object made using the AM methods described herein. In some other embodiments, this term can refer to the starting materials (e.g., individual metals or metal precursors that are not pre-mixed and/or provided by alloy atomized ingots) that are used to form a layer of a fabricated object made using the AM methods described herein. In some particular embodiments, the feedstock can be a powder.

Intermetallic Phase: A solid-state compound present in a fabricated object comprising an alloy embodiment of the present disclosure. In some embodiments, the intermetallic phase contains two or more metallic elements and can exhibit metallic bonding, defined stoichiometry, and/or an ordered crystal structure, optionally with one or more non-metallic elements. In some instances, a fabricated object comprising an alloy of the present disclosure may include regions of a single metal (e.g., Al) and regions of an intermetallic phase (e.g., a ternary intermetallic phase like $Al_{23}Ni_6Ce_4$, $Al_7Ni_2Ce$, or $Al_{20}Mn_2Ce$; and/or one or more additional binary phases like $Al_{11}Ce_3$ or $Al_3Ni$; and/or one or more quaternary intermetallic phases). Additional intermetallic phases are described herein.

Immediately Adjacent: When used in reference to the position of one or more layers provided and/or made during an additive manufacturing process used to make fabricated objects of the present disclosure, this term refers to a physical orientation (or ordering) of the reference layer and another layer wherein the reference layer and the other layer are in direct physical contact (e.g., the reference layer is positioned on top of, on the bottom of, or to the immediate left/right of the other layer).

Lattice-Like Microstructure: When used in reference to the disposition of one or more phases in the microstructure, this term refers to a microstructure having a plurality of thin, elongate, interconnected regions of a phase, typically disposed between other phases.

Measured Amount: An amount of an alloy component (e.g., an element) as determined by evaluating a fabricated object using a suitable technique, such as inductively coupled plasma. In some embodiments, the measured amount of an alloy component may be different from a nominal amount of that alloy component, but typically not by an amount that deleteriously affects the mechanical properties of the fabricated object.

Melt Pool (or Melt Region): As used herein, the terms "melt region" or "melt pool" refer to a region of a fabricated object (or intermediate form thereof) that has been melted (e.g., by exposure to a laser or induction melting) and re-solidified.

Microstructure: The fine structure of an alloy (e.g., grains, cells, dendrites, rods, laths, platelets, precipitates, etc.) that can be visualized and examined with a microscope at a magnification of at least 25×. Microstructure can also include nanostructure (e.g., a structure that can be visualized and examined with more powerful tools, such as electron microscopy, transmission electron microscopy, atomic force microscopy, X-ray computed tomography, etc.).

Minor Alloying Elements: Elements added intentionally to modify the properties of an alloy. Exemplary minor alloying elements can include manganese, silicon, magnesium, iron, zirconium, scandium, vanadium, titanium, erbium, hafnium or combinations thereof. If manganese or iron are present as minor alloying elements, they can be included in amounts ranging from 0 wt % to 3 wt % for each element individually. If magnesium, and/or zirconium are present as minor alloying elements, they can be included in amounts ranging from 0 to 2 wt %, such as greater than 0 to 1 wt % or greater than 0 to 0.5 wt % for each element individually. In embodiments comprising silicon, scandium, vanadium, titanium, erbium, each such minor alloying element is present, individually, in an amount ranging from 0 to 1% or less, such as greater than 0 to 1% or less.

Mischmetal: An alloy of rare earth elements, typically comprising 47-70 wt % cerium and from 25-45 wt % lanthanum. Mischmetal may further include small amounts of neodymium, praseodymium, and/or trace amounts (i.e., less than 1 wt %) of other rare earth elements, and may include small amounts (i.e., up to a total of 15 wt %) of impurities such as Fe or Mg. In some examples, mischmetal comprises 47-70 wt % Ce, 25-40 wt % La, 0.1-7 wt % Pr, 0.1-17 wt % Nd, up to 0.5 wt % Fe, up to 0.2 wt % Si, up to 0.5 wt % Mg, up to 0.02 wt % S, and up to 0.01 wt % P. In certain examples, mischmetal comprises 50 wt % cerium, 25-30 wt % La, with the balance being other rare-earth metals. In one example, mischmetal comprises 50 wt % Ce, 25 wt % La, 15 wt % Nd, and 10 wt % other rare earth metals and/or iron. In an independent example, mischmetal comprises 50 wt % Ce, 25 wt % La, 7 wt % Pr, 3 wt % Nd, and 15 wt % Fe.

Molten: As used herein, a metal is "molten" when the metal has been converted to a liquid form by heating. In some embodiments, the entire amount of metal present may be converted to a liquid or only a portion of the amount of metal present may be converted to liquid (wherein a portion comprises greater than 0% and less than 100% [wt % or vol %] of the amount of metal, such as 90%, 85%, 80%, 70%, 60%, 50%, 40%, 30%, 20%, 10%, 5%, and the like.

Nodular Feature: When used in reference to the microstructure of an alloy, a nodular feature is a microstructural region of a particular chemistry having rounded and irregular boundaries, distinct from surrounding regions of different chemistry.

Nodular Microstructure: When used in reference to the disposition of one or more phases in the microstructure, this term refers to a microstructure having a plurality of nodular features isolated by regions of differing chemistry.

Nominal Amount: An amount of an alloy component (e.g., an element) typically present in a feedstock and/or a feedstock precursor. In some embodiments, the nominal amount of an alloy component may be different from a measured amount of that alloy component, but typically not by an amount that deleteriously affects the mechanical properties of any fabricated object made using the feedstock.

Trace Impurities: Elements that may be found in an alloy embodiment at low levels due to contamination resulting from processing (e.g., from manufacturing materials and/or equipment) and/or present in starting materials used to make an alloy embodiment.

Ultimate Tensile Strength (or Ultimate Tensile Stress): The stress a material can withstand before tensile fracture occurs.

Vickers Hardness: A hardness measurement determined by indenting a test material with a pyramidal indenter, particular to Vickers hardness testing units, that is subjected to a load of 50 to 5000 gf for a period of time and measuring the resulting indent size. Vickers hardness may be expressed in units of HV. In particular disclosed embodiments, the Vickers hardness can be measured by as measured by ASTM method E384.

Yield Strength (or Yield Stress): The stress a material can withstand without permanent deformation; the stress at which a material begins to deform plastically.

II. Introduction

Aluminum alloys have been increasingly used to replace heavier alloys in weight-critical applications, owing to their higher strength-to-weight ratios, specific stiffness, corrosion resistance, and recyclability. Simultaneously, metal additive manufacturing ("AM") has recently emerged as a promising method for producing complex, optimized geometries that cannot be fabricated with conventional manufacturing techniques.

Very few Al alloys, however, have been successfully adopted for additive manufacturing. One major barrier to the adoption of Al alloys is the susceptibility of conventional Al alloy chemistries, initially designed for wrought processing, to hot tearing when exposed to the high cooling rates associated with AM processing. This hot tearing is fundamentally related to the morphology of the "mushy zone", characterized by the formation of networks of FCC-Al dendrites, which inhibit liquid feeding to the regions most at risk of cracking. This vulnerability to hot tearing may be reduced by shortening the temperature range over which an alloy is partially-solidified. Consequently, most additive manufacturing of Al alloys has been done utilizing near-eutectic Al—Si compositions. Unfortunately, these Al—Si compositions do not yield properties that are competitive with commercially-available wrought Al alloys or aerospace grad precipitation hardened alloys. Furthermore, the development of new Al alloy compositions for additive manufacturing has chiefly been limited to modifying existing compositions or adding grain refiners to reduce hot tearing susceptibility.

Al alloys also have been sought as replacements for Ti alloys for use in moderate temperature applications (e.g. 250-450° C.), but Al alloys currently known in the art lose a large fraction of their strength above approximately 200° C. Consequently, even if existing Al alloy compositions could be modified for use in AM and potentially provide similar properties to wrought products, they are unlikely to enable elevated temperature performance.

Al alloys that would have the highest probability of industrial adoption would provide property sets that cannot be obtained with conventional processing routes. And, if an Al alloy is to be used in AM, it should be amenable to the extreme thermal conditions in additive manufacturing. Such Al alloy embodiments are disclosed herein and exhibit minimal manufacturing defects, a desirable microstructure, mechanical properties at ambient temperature that are better (or at least no worse) than current peak-aged wrought alloys, and also retain a high fraction of their strength at high temperatures (e.g., temperatures above 200° C., such as 250° C. to 800° C., or 250° C. to 700° C., or 250° C. to 600° C., or 250° C. to 500° C.). By way of comparison, most wrought alloys are designed for precipitation hardening and their solidification microstructure often includes deep dendritic mushy zones with limited permeability for liquid feeding, enabling cracking near the base of the dendrites. In the solid state, precipitation is a potent strengthening mechanism, but these precipitates easily coarsen or dissolve at elevated temperatures. Also, while near-eutectic alloys can reduce the hot-tear susceptibility by reducing the depth of the mushy zone, they also can produce comparatively coarse microstructures relative to solid-state precipitation, with correspondingly lower strengths.

Al—Sc alloys (commercialized as "Scalmalloy") are known for their use in casting and rapid solidification processes due to their good age hardening by the precipitation of $Al_3Sc$ $L1_2$ particles. While such alloys have recently been adapted for AM, even very small amounts of Sc dramatically increase the cost of these alloys, and the effect of precipitation strengthening still degrades at elevated temperatures. Additionally, Al—Mg—Zr alloys are processable due to the grain refining effect of $Al_3Zr$ primary intermetallic particles that form in the liquid near the melt pool boundaries and, while such alloys display an increase in hardness with aging at 400° C. (likely due to additional precipitation of nano-scale $Al_3Zr$ $L1_2$ particles), they begin to decrease in hardness if overaged past approximately 20 hours.

Most Al alloys designed for AM to-date rely on L12 type precipitates for strengthening and grain refinement, and the limited thermal stability of these particles restricts their use for high-temperature applications. The low solubility of most elements in Al also limits the total volume fraction of $L1_2$ precipitates. As such, there exists a need in the art for Al alloys that can be used in AM methods. The present disclosure describes alloy embodiments that reach a balance between appropriate strengthening mechanisms and manufacturability and microstructure stability at elevated temperatures. The present disclosure is directed to alloy embodiments that are suitable for AM methods, including, but not limited to, layer-by-layer manufacturing methods suitable for metal alloys, such as direct metal laser sintering, direct energy deposition, electron beam melting, selective heat sintering, selective laser melting, selective laser sintering, laser powder bed additive manufacturing, and microinduction. In particular embodiments, the alloy embodiments exhibit exceptional properties when processed with rapid solidification techniques. And, the alloy embodiments are suitable for use in AM methods that result in bulk production of alloys.

III. Alloy Embodiments

Alloy embodiments herein can comprise a ternary combination of Al, Ce, and Ni. The Al—Ce—Ni alloy embodiments are specifically designed for additive manufacturing methods and exhibit good strength, retention of strength at high temperatures, and resistance to hot tearing. In some embodiments, the Al—Ce—Ni alloy can comprise Al, Ce, and Ni as the main alloying components and can further comprise other minor alloying elements and/or trace impurities.

Al—Ce—Ni alloy embodiments described herein can comprise Ce in an amount ranging from greater than 0 wt % to 35 wt %, such as 0.1 wt % (or higher) to 25 wt %, 1 wt % (or higher) to 18%, or 1 wt % (or higher) to 12 wt %, wherein such amounts include nominal and/or measured amounts. In some embodiments, Ce can be present in an amount ranging from more than 2 wt % to 25 wt %, such as 4 wt % to 25 wt %, or 6 wt % to 25 wt %, or 8 wt % to 25 wt %, or 10 wt % to 25 wt %, or 12 wt % to 25 wt %, or 15 wt % to 25 wt %, wherein such amounts include nominal and/or measured amounts. In particular embodiments, Ce can be present in an amount ranging from 4 wt % to 20 wt %, such as 6 wt % to 20 wt %, 8 wt % to 20 wt %, 10 wt % to 20 wt %, 12 wt % to 20 wt %, 14 wt % to 20 wt %, 16 wt % to 20 wt %, or 18 wt % to 20 wt %, wherein such amounts include nominal and/or measured amounts. In other embodiments, Ce can be present in an amount ranging from 6 wt % to 12 wt %, such as 6 wt %, 7 wt %, 8 wt %, 9 wt %, 10 wt %, 11 wt %, or 12 wt %, wherein such amounts include nominal and/or measured amounts. In one specific embodiment, Ce is present in an amount of 9 wt %, which can be a nominal and/or measured amount. Al—Ce—Ni alloy embodiments escribed herein can also comprise Ni ranging from greater than 1 wt % to 35 wt %, such as such as 2 wt % (or higher) to 35 wt %, 5 wt % (or higher) to 35 wt %, 10 wt % (or higher) to 35 wt %, 15 wt % (or higher) to 35 wt %, 20 wt % (or higher) to 35 wt %, or 25 wt % (or higher) to 35 wt %, wherein such amounts include nominal and/or measured amounts. In some embodiments, Ni can be present in an amount ranging from more than 2 wt % to 25 wt %, such as 4 wt % to 25 wt %, 6 wt % to 25 wt %, 8 wt % to 25 wt %, 10 wt % to 25 wt %, 12 wt % to 25 wt %, 14 wt % to 25 wt %, 16 wt % to 25 wt %, 18 wt % to 25 wt %, or 20 wt % to 25 wt %, wherein such amounts include nominal and/or measured amounts. In particular embodiments, Ni can be present in an amount ranging from 4 wt % to 20 wt %, such as 6 wt % to 20 wt %, 8 wt % to 20 wt %, 10 wt % to 20 wt %, 12 wt % to 20 wt %, 14 wt % to 20 wt %, 16 wt % to 20 wt %, or 18 wt % to 20 wt %, wherein such amounts include nominal and/or measured amounts. In other embodiments, Ni can be present in an amount ranging from 5 wt % to 15 wt %, such as 6 wt %, 7 wt %, 8 wt %, 9 wt %, 10 wt %, 11 wt %, 12 wt %, 13 wt %, or 14 wt %, wherein such amounts include nominal and/or measured amounts. In one representative embodiment, Ni content can be 4 wt %, which can be a nominal and/or a measured amount. In an independent embodiment, the Ni content is greater than 8 wt %, either nominally and/or as measured. Al—Ce—Ni alloy embodiments disclosed herein can also comprise trace amounts of impurity elements resulting from the feedstock elements or processing conditions. The amount of aluminum present makes up the balance of the alloy composition after the quantity of Ce, Ni, and any minor elements and/or impurities have been accounted for.

In some embodiments, the minor alloying elements that can be present in the Al—Ce—Ni system include chromium manganese, silicon, magnesium, iron, zirconium, scandium, vanadium, titanium, erbium, and hafnium. In some embodiments, the amount of chromium can be 5 wt % or less. In some embodiments, the amount of any manganese or iron is, for each element individually, 3 wt % or less. In some embodiments, the amount of any zirconium is, for each element individually, 2 wt % or less. In particular embodiments, the amount of silicon is less than 1 wt %. Al—Ce—Ni alloys disclosed herein may further contain one or more elements, which in aluminum alloys, may form desirable precipitates. In some embodiments, the amount of vanadium, titanium, hafnium, erbium, or scandium is, for each element, individually, an amount ranging from 0 to 1 wt %, such as greater than 0 to 1 wt % or less. Element amounts specified in this paragraph can be nominal and/or measured amounts.

In particular disclosed embodiments, the aluminum alloy consists essentially of aluminum, cerium in an amount ranging from greater than 0 wt % to 35 wt %, nickel in an amount ranging from greater than 1 wt % to than 35 wt %, and trace impurities. In an independent embodiment, the aluminum alloy consists of aluminum, cerium in an amount ranging from greater than 0 wt % to 35 wt %, nickel in an amount ranging from greater than 1 wt % to than 35 wt %, and trace impurities. In yet additional embodiments, the aluminum alloy consists essentially of aluminum, cerium in an amount ranging from greater than 0 wt % to 35 wt %, nickel in an amount ranging from greater than 1 wt % to than 35 wt %, one or more additional alloying elements selected from manganese in an amount up to 3 wt %, iron in an amount up to 3 wt %, magnesium in an amount up to 2 wt %, silicon in an amount up to 1 wt %, and chromium in an amount up to 5 wt %, and trace impurities. In an independent embodiment, the aluminum alloy consists of aluminum, cerium in an amount ranging from greater than 0 wt % to 35 wt %, nickel in an amount ranging from greater than 1 wt % to than 35 wt %; one or more additional alloying elements selected from manganese in an amount up to 3 wt %, iron in an amount up to 3 wt %, magnesium in an amount up to 2 wt %, silicon in an amount up to 1 wt %, and chromium in an amount up to 5 wt %; and trace impurities. In yet additional embodiments, the aluminum alloy consists essentially of aluminum, cerium in an amount ranging from greater than 0 wt % to 35 wt %, nickel in an amount ranging from greater than 1 wt % to than 35 wt %; one or more precipitate-forming elements selected from zirconium in an amount up to 2 wt %, vanadium in an amount up to 1 wt %, titanium in an amount up to 1 wt %, hafnium in an amount up to 1 wt %, erbium in an amount up to 1 wt %, or scandium in an amount up to 1 wt %; and trace impurities. In an independent embodiment, the aluminum alloy consists of aluminum, cerium in an amount ranging from greater than 0 wt % to 35 wt %, nickel in an amount ranging from greater than 1 wt % to than 35 wt %; one or more precipitate-forming elements selected from zirconium in an amount up to 2 wt %, vanadium in an amount up to 1 wt %, titanium in an amount up to 1 wt %, hafnium in an amount up to 1 wt %, erbium in an amount up to 1 wt %, or scandium in an amount up to 1 wt %; and trace impurities. In yet additional embodiments, the aluminum alloy consists essentially of aluminum, cerium in an amount ranging from greater than 0 wt % to 35 wt %, nickel in an amount ranging from greater than 1 wt % to than 35 wt %; one or more additional alloying elements selected from manganese in an amount up to 3 wt %, iron in an amount up to 3 wt %, magnesium in an amount up to 2 wt %, silicon in an amount up to 1 wt %, and chromium in an amount up to 5 wt %; one or more precipitate-forming elements selected from zirconium in an amount up to 2 wt %, vanadium in an amount up to 1 wt %, titanium in an amount up to 1 wt %, hafnium in an amount up to 1 wt %, erbium in an amount up to 1 wt %, or scandium in an amount up to 1 wt %; and trace impurities. In an independent embodiment, the aluminum alloy consists of aluminum, cerium in an amount ranging from greater than 0 wt % to 35 wt %, nickel in an amount ranging from greater than 1 wt % to than 35 wt %; one or more additional alloying elements selected from manganese in an amount up to 3 wt %, iron in an amount up to 3 wt %, magnesium in an amount up to 2 wt %, silicon in an amount up to 1 wt %, and chromium in an amount up to 5 wt %; one or more precipitate-forming elements selected from zirconium in an amount up to 2 wt %, vanadium in an amount up to 1 wt %, titanium in an amount up to 1 wt %, hafnium in an amount up to 1 wt %, erbium in an amount up to 1 wt %, or scandium in an amount up to 1 wt %; and trace impurities. "Consists essentially of" means that the alloy does not include any additional components that affect the measured values for a chemical and/or mechanical property of the alloy by more than 10%, such as 5% to 2%, relative to a comparable alloy that is devoid of the additional components. Element amounts specified in this paragraph can be nominal and/or measured amounts.

Naturally occurring mischmetal may be a less expensive alternative than pure cerium. Natural mischmetal has a variable composition, but typically comprises, in terms of weight percent, 50 wt % cerium, 30 wt % lanthanum, balance other rare earth elements. Thus, in some independent embodiments, cerium component can be obtained using mischmetal rather than pure cerium. In such embodiments, the Al—Ce—Ni alloy will typically further comprise at least some lanthanum. Element amounts specified in this paragraph can be nominal and/or measured amounts.

In some embodiments, the amount of Ce and Ni included in the alloy can be sufficient to provide a specific microstructure and/or intermetallic phases in the microstructure, particularly at the high cooling rates associated with the additive manufacturing processes. In some embodiments, the amount of Ce and Ni present are sufficient to form an $Al_{23}Ni_6Ce_4$ intermetallic phase when components are fabricated from the alloy under the conditions present in additive manufacturing processes. In other particular embodiments, the amount of Ce and Ni present are sufficient to form an $Al_7Ni_2Ce$ intermetallic phase when components are fabricated from the alloy under the conditions present in additive manufacturing processes. In other particular embodiments, the amount of Ce and Ni present are sufficient to form an $Al_{20}Mn_2Ce$ intermetallic phase when components are fabricated from the alloy under the conditions present in additive manufacturing processes. Such amounts are disclosed herein In one specific embodiment, the Al—Ce—Ni alloy can comprise 9 wt % Ce, 4 wt % Ni, and low or trace amounts of Mn, Fe, Zr, Mg, Si, and Cu such as less than 0.1 wt % Mn, less than 0.5 wt % Fe, less than 0.5 wt % Si, less than 0.1 wt % Zr, less than 0.1 wt % Mg, and less than 0.1 wt % Cu and with the balance made up by aluminum.

In another specific embodiment, the Al—Ce—Ni alloy can comprise 9 wt % Ce, 3 wt % Ni, 1 wt % Mn, and low or trace amounts of Fe, Zr, Mg, Si, and Cu, such as less than 0.5 wt % Fe, less than 0.5 wt % Si, less than 0.1 wt % Zr, less than 0.1 wt % Mg, and less than 0.1 wt % Cu, with the balance made up by aluminum.

IV. Method Embodiments

Disclosed herein are embodiments of an AM method using the Al—Ce—Ni alloy embodiments disclosed herein. The AM method embodiments described herein can involve layer-by-layer manufacturing methods suitable for metal alloys, such as direct metal laser sintering, direct energy deposition, electron beam melting, selective heat sintering, selective laser melting, selective laser sintering, laser powder bed additive manufacturing and microinduction. Additive manufacturing of the Al—Ce—Ni alloy compositions disclosed herein can comprise preparing a powder feedstock, depositing the powder feedstock on a build platform, treating the powder feedstock with an energy source to cause melting and/or sintering, and repeating the deposition and energy treatment processes as necessary to form a desired fabricated object.

Al—Ce—Ni alloy embodiments of the present disclosure can be used in the method and are in the form of a feedstock. In particular embodiments, the feedstock is in the form of a powder or a wire. In some embodiments, the feedstock powder can be made by combining the alloying elements discussed above and producing a cast ingot from the Al—Ce—Ni alloy. The cast ingot can then be atomized under an inert atmosphere to provide the feedstock powder. In some embodiments, the feedstock powder can be sieved to provide a particular size distribution. In representative embodiments described herein the size distribution can range from 1 μm to 200 μm, such as 20 μm to 70 μm, such as 20 μm to 65 μm, or 20 μm to 60 μm. However, other powder particle and/or grain sizes can be made depending on the AM technique to be used. These would be recognized by person of ordinary skill in the art with the guidance of the present disclosure. In yet other embodiments, feedstocks in the form of a wire or other non-powdered form can be used to form the fabricated Al—Ce—Ni alloy embodiments described herein.

The additive manufacturing method for the Al—Ce—Ni alloy embodiments disclosed herein can be carried out using a device, such as a device used in a laser-based additive manufacturing method. The device can include a powder bed, an energy source, a build platform, a deposition apparatus capable of depositing the feedstock (e.g., a roller, a blade, and the like), and other suitable components that will be recognized by a person of ordinary skill in the art with the benefit of the present disclosure. In some embodiments, the method comprises adding a first amount of a feedstock comprising the Al—Ce—Ni alloy to a build platform, exposing the first amount, or a portion thereof, of the feedstock to an energy source to provide a first energy treated region on the build platform; adding a second amount of feedstock to the built platform, wherein the second amount of the feedstock is positioned immediately adjacent to the first energy-treated region on the build platform; and exposing the second amount, or a portion thereof, of the feedstock to the energy source to provide a second energy-treated region on the build platform. In some embodiments, the feedstock is contained in a powder bed that is coupled to the building platform.

The energy source can be a laser or other energy source sufficient to provide sufficient energy to melt and consolidate the feedstock (e.g., a heater or the like). When exposed to the energy source, the feedstock is sintered and/or melted to provide an energy-treated region (e.g., a consolidated region). This region can be allowed to cool and solidify. The process is repeated to provide sequential layers of energy-treated regions that become fused together during the process, thereby producing the fabricated object. In some embodiments, the method can further comprise preparing a feedstock powder used in embodiments of the method by casting the Al—Ce—Ni alloy into an ingot and atomizing the ingot to provide the feedstock powder. In some embodiments, method parameters can be modified to increase growth velocity, such as by increasing the laser velocity and decreasing the preheat temperature, particularly for laser powder bed fusion additive manufacturing. In yet some additional embodiments, additional heat treatment steps can be performed. In some such embodiments, the additional heat treatment could increase ductility.

V. Fabricated Component Embodiments

The microstructure of fabricated components made from the Al—Ce—Ni alloys and additive manufacturing processes of the present disclosure can comprise an aluminum-based matrix phase and one or more intermetallic phases. In some embodiments, components fabricated from the Al—Ce—Ni alloys disclosed herein may further comprise precipitate phases.

Figure 7A:
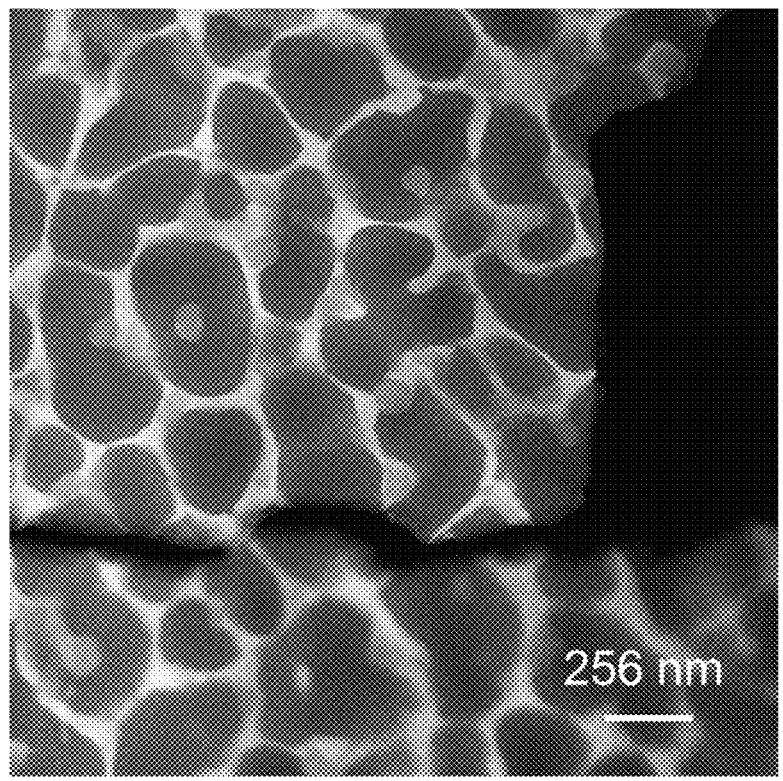
FIGS. 7A and 7B show scanning transmission electron microscopy micrographs of an Al—Ce—Ni alloy according to embodiments disclosed herein, wherein the dark regions show are the aluminum matrix phase and the bright regions shown are the intermetallic phase or phases.

In some embodiments the aluminum-based matrix phase is arranged in a cellular structure, with one or more intermetallic phases occupying the space between the aluminum-based matrix features, as shown in FIG. 7A. In some embodiments, the aluminum-based matrix phase can have a dendritic structure, with one or more intermetallic phases occupying the space between the dendrites and/or dendrite arms. In yet additional embodiments, the aluminum-based matrix can have a nodular structure, with one or more intermetallic phases occupying the space between the nodular aluminum regions.

Fabricated components additively manufactured according to the disclosed embodiments and comprising the Al—Ce—Ni alloys disclosed herein may demonstrate a unique morphology and composition of the aluminum matrix phase. In various embodiments, such as that shown in FIG. 5A, the aluminum matrix phase can comprise features having an average size between 20 nm and 10 µm in size, such as 50 nm to 1 µm or 200 nm to 500 nm. In some embodiments, the features of the aluminum matrix phase may be cellular features with an average size between 20 nm and 10 µm. In yet additional embodiments, the features of the aluminum matrix phase may be nodular features with an average size between 20 nm and 10 µm.

In some disclosed embodiments, objects fabricated from the Al—Ce—Ni alloy according to the additive manufacturing techniques disclosed herein, the aluminum matrix phase may uniquely comprise additional elements in solid solution. For example, in certain disclosed embodiments having manganese, the majority of the Mn content of the Al—Ce—Ni alloy is observed to remain in solution in the aluminum matrix phase. In other disclosed embodiments, the aluminum matrix phase may comprise nickel content in solid solution. In the various embodiments disclosed herein, the quantity of elements retained in solid solution within the matrix phase may exceed the quantity of elements that would be contained in solid solution under conditions typical of conventional casting processes.

Fabricated components additively manufactured according to the method embodiments disclosed herein and comprising the Al—Ce—Ni alloys disclosed herein further comprise one or more intermetallic phases. In some embodiments, the microstructure of the Al—Ce—Ni alloy comprises an $Al_{23}Ni_6Ce_4$ intermetallic. In some embodiments, the microstructure of the Al—Ce—Ni alloy comprises an $Al_{11}Ce_3$ intermetallic. In some embodiments, the microstructure of the Al—Ce—Ni alloy comprises an $Al_3Ni$ intermetallic. In some embodiments, the microstructure of the Al—Ce—Ni alloy comprises an $Al_7Ni_2Ce$ intermetallic. In some embodiments having some manganese content, the microstructure of the Al—Ce—Ni alloy comprises an $Al_{20}Mn_2Ce$ intermetallic In yet additional embodiments, a combination of more than one of the $Al_{23}Ni_6Ce_4$, $Al_{11}Ce_3$, $Al_7Ni_2Ce$, $Al_{20}Mn_2Ce$, or $Al_3Ni$ intermetallics are present simultaneously, such as $Al_{23}Ni_6Ce_4$ and $Al_{11}Ce_3$; $Al_{23}Ni_6Ce_4$ and $Al_3Ni$; $Al_{23}Ni_6Ce_4$ and $Al_7Ni_2Ce$; $Al_{23}Ni_6Ce_4$ and $Al_7Ni_2Ce$; $Al_{11}Ce_3$ and $Al_3Ni$; $Al_{11}Ce_3$ and $Al_7Ni_2Ce$; $Al_{11}Ce_3$ and $Al_{20}Mn_2Ce$; $Al_3Ni$ and $Al_7Ni_2Ce$; $Al_3Ni$ and $Al_{20}Mn_2Ce$; $Al_7Ni_2Ce$ and $Al_{20}Mn_2Ce$; $Al_{23}Ni_6Ce_4$, $Al_{11}Ce_3$, and $Al_7Ni_2Ce$; $Al_{23}Ni_6Ce_4$, $Al_{11}Ce_3$, and $Al_{20}Mn_2Ce$; $Al_{23}Ni_6Ce_4$, $Al_{11}Ce_3$, and $Al_3Ni$; $Al_{23}Ni_6Ce_4$, $Al_7Ni_2Ce$, and $Al_{20}Mn_2Ce$; $Al_{23}Ni_6Ce_4$, $Al_7Ni_2Ce$, and $Al_3Ni$; $Al_{23}Ni_6Ce_4$, $Al_{20}Mn_2Ce$, and $Al_3Ni$; $Al_{11}Ce_3$, $Al_7Ni_2Ce$, and $Al_{20}Mn_2Ce$; $Al_{11}Ce_3$, $Al_7Ni_2Ce$, and $Al_3Ni$; $Al_{11}Ce_3$, $Al_{20}Mn_2Ce$, and $Al_3Ni$; $Al_{11}Ce_3$, $Al_7Ni_2Ce$, $Al_{20}Mn_2Ce$, and $Al_{20}Mn_2Ce$, and $Al_3Ni$; $Al_{23}Ni_6Ce_4$, $Al_7Ni_2Ce$, $Al_{20}Mn_2Ce$, and $Al_3Ni$; $Al_{23}Ni_6Ce_4$, $Al_{11}Ce_3$, $Al_{20}Mn_2Ce$, and $Al_3Ni$; $Al_{23}Ni_6Ce_4$, $Al_{11}Ce_3$, $Al_7Ni_2Ce$, and $Al_3Ni$; $Al_{23}Ni_6Ce_4$, $Al_{11}Ce_3$, $Al_7Ni_2Ce$, and $Al_{20}Mn_2Ce$; and/or $Al_{23}Ni_6Ce_4$, $Al_{11}Ce_3$, $Al_7Ni_2Ce$, $Al_{20}Mn_2Ce$, and $Al_3Ni$ In some disclosed embodiments of the Al—Ce—Ni alloys described herein, the one or more intermetallic phases is disposed in one or more interconnected and/or lattice like structures that occupies the space between the features of the aluminum-based matrix phase, as shown in FIG. 7A. For example, in certain embodiments having a cellular aluminum-based matrix phase, the one or more intermetallic phases can occupy the space between adjacent cells. In other embodiments having a nodular aluminum-based matrix phase, the one or more intermetallic phases can occupy the space between adjacent nodules, and the space between the contours of individual nodules. In embodiments having a dendritic aluminum-based matrix phase, the one or more intermetallic phases can occupy the spaces between adjacent dendrites as well as the spaces between dendrite arms. In such embodiments, the thickness of the intermetallic phase corresponds to the intergranular spacing between aluminum matrix grains and/or the shape of the individual features. The spacing between adjacent features is a distance typically less than 100 nm, such as 10-50 nm, or 20 nm, such that the maximum thickness of an intermetallic phase region is typically 100 nm, such as 10-50 nm, or 20 nm.

In some embodiments, the microstructure of components fabricated from the Al—Ce—Ni alloys disclosed herein via additive manufacturing processes disclosed herein can further comprise precipitate phases. Precipitates may be formed from aluminum and one or more of zirconium, vanadium, titanium, hafnium, erbium, or scandium, and can, in various embodiments be $L1_2Al_3X$ precipitates, where X is selected from zirconium, vanadium, titanium, hafnium, erbium, or scandium. For example, in some embodiments, the component microstructure can comprise $Al_3Zr$ precipitates. In other embodiments the component microstructure can comprise $Al_3V$ precipitates. In still other embodiments, the component microstructure can comprise $Al_3Ti$ precipitates. In other embodiments, the component microstructure can comprise $Al_3Hf$ precipitates. In further embodiments, the component microstructure can comprise $Al_3Er$ precipitates. In yet further embodiments, the component microstructure can comprise $Al_3Sc$ precipitates. In still other embodiments, the component microstructure can comprise more than one kind of precipitate selected from $Al_3Zr$, $Al_3V$, $Al_3Ti$, $Al_3Hf$, $Al_3Er$, and $Al_3Sc$. In some embodiments having manganese content, the alloy microstructure may also include manganese-rich precipitates.

Fabricated Al—Ce—Ni objects made using embodiments disclosed herein can include microstructures and/or phases that cannot be obtained using casting methods or other non-AM methods known in the art. In particular disclosed embodiments, the fabricated Al—Ce—Ni alloy objects are components used in the automotive, locomotive, aircraft, and aerospace industries. In some embodiments, the fabricated object is a bulk component. Bulk components are distinct from thin sections made using rapid solidification processes, such as melt spinning. Some exemplary products include, but are not limited to, automotive powertrain components (such as engine pistons, cylinder heads, blocks, water cooled turbocharger manifolds, and other automotive components), aerospace components, heat exchanger components, and any other components requiring aluminum alloys that do not lose structural integrity and/or strength at high temperatures (e.g., temperatures above 200° C.).

VI. Overview of Specific Embodiments

Disclosed herein are embodiments of an alloy composition, comprising: greater than 0 wt % to 35 wt % cerium; greater than 1 wt % to 35 wt % nickel; 0 wt % to 3 wt % manganese; 0 wt % to 3 wt % iron; 0 wt % to 2 wt % magnesium; 0 wt % to 2 wt % zirconium; 0 wt % to 1 wt % silicon; 0 wt % to 5 wt % chromium; a balance of aluminum; and wherein the amount of cerium and amount of nickel present in the alloy composition are sufficient to cause the formation of at least one intermetallic selected from $Al_{23}Ni_6Ce_4$, $Al_{11}Ce_3$, $Al_7Ni_2Ce$, $Al_{20}Mn_2Ce$ or $Al_3Ni$. In some embodiments, the alloy composition does not comprise 12 wt % Ce, 13 wt % Ce, or 14 wt % Ce if Ni is present in an amount of 5 wt %, 6 wt %, or 7 wt %.

In some embodiments, the alloy comprises one or more of vanadium, titanium, hafnium, erbium, or scandium in an amount less than 1 wt % for each element taken individually.

In any or all of the above embodiments, the alloy composition comprises an aluminum-based matrix phase with isolated features having an average length of 50 nm to 50 µm; and an intermetallic phase having lattice-like structures between the aluminum-based matrix features, with a thickness ranging from 10 nm to 100 nm.

In any or all of the above embodiments, the cerium is present in an amount ranging from 2 wt % to 25 wt %.

In any or all of the above embodiments, the cerium is present in an amount ranging from 4 wt % to 20 wt %.

In any or all of the above embodiments, the nickel is present in an amount ranging from 2 wt % to 25 wt %.

In any or all of the above embodiments, the nickel is present in an amount ranging from 4 wt % to 20 wt %.

In any or all of the above embodiments, the alloy comprises 9 wt % cerium, 4 wt % nickel, trace impurities, and a balance of aluminum.

In any or all of the above embodiments, the alloy comprises 10 wt % cerium, 3 wt % nickel, 1 wt % manganese, trace impurities, and a balance of aluminum.

Also disclosed herein are embodiments of a fabricated object comprising the alloy composition as disclosed herein, wherein the fabricated object comprises a heterogeneous microstructure having: an aluminum-based matrix phase; and an intermetallic phase, wherein: the aluminum-based matrix phase further comprises isolated features with an average length of 50 nm to 50 µm; and the intermetallic phase further comprises lattice-like structures between the aluminum-based matrix features, with a thickness ranging from 10 nm to 100 nm.

In any or all of the above embodiments, the heterogenous microstructure further comprises at least one precipitate phase.

In any or all of the above embodiments, the at least one precipitate phase is one or more of $Al_3Zr$, $Al_3V$, $Al_3Ti$, $Al_3Hf$, $Al_3Er$, and $Al_3Sc$.

In any or all of the above embodiments, the at least one precipitate phase contains manganese.

In any or all of the above embodiments, the aluminum-based matrix phase further comprises manganese or zirconium in solid solution.

In any or all of the above embodiments, the intermetallic phase comprises at least one of $Al_{23}Ni_6Ce_4$, $Al_{11}Ce_3$, $Al_7Ni_2Ce$, $Al_{20}Mn_2Ce$ or $Al_3Ni$.

Also disclosed herein are embodiments of an alloy composition for additive manufacturing, comprising: cerium and nickel, wherein the cerium and nickel are independently present in an amount sufficient to provide at least one of an $Al_{23}Ni_6Ce_4$, $Al_{11}Ce_3$, $Al_7Ni_2Ce$, $Al_{20}Mn_2Ce$ or $Al_3Ni$ intermetallic phase in an additively manufactured component; and a balance of aluminum.

In any or all of the above embodiments, the alloy composition further comprises one or more additive alloying elements selected from manganese, zirconium, magnesium, silicon, iron, chromium, vanadium, titanium, erbium, hafnium, and scandium.

Also disclosed herein are embodiments of a method, comprising (a) combining aluminum with (i) nickel ranging from greater than 1 wt % to 35 wt %, (ii) cerium ranging from greater than 0 wt % to 35 wt % to form an aluminum-based alloy composition; (b) adding a first amount of feedstock comprising the aluminum-based alloy composition to a build platform; (c) exposing the first amount, or a portion thereof, of the feedstock to an energy source to provide a first energy-treated region on the build platform; (d) adding a second amount of the feedstock to the build platform wherein the second amount of the feedstock is positioned immediately adjacent to the first energy-treated region on the build platform; and (e) exposing the second amount, or a portion thereof, of the feedstock to the energy source to provide a second energy-treated region on the build platform.

In any or all of the above embodiments, the method further comprises repeating any of steps (b) through (e).

In any or all of the above embodiments, the feedstock is a feedstock powder and the energy source is a laser.

In any or all of the above embodiments, each of the first energy treated region and the second energy treated region comprises a consolidated alloy formed from melting and consolidating particles of the feedstock powder.

In any or all of the above embodiments, the method is used to make a fabricated bulk component comprising an Al—Ce—Ni alloy and comprising a heterogenous microstructure.

In any or all of the above embodiments, step (a) further comprises (i) adding chromium in an amount less than or equal to 5 wt %; (ii) adding at least one of manganese or iron in an amount less than or equal to 3 wt % for each element taken individually; (iii) adding at least one of zirconium or magnesium in an amount less than or equal to 2 wt % for each element individually; (iv) adding at least one of silicon vanadium, titanium, hafnium, erbium, or scandium in an amount less than 1 wt % for each element taken individually; or any combination of (i), (ii), (iii) and/or (iv).

VII. Examples

Heat Treatment, Hardness, and Mechanical Testing—With reference to the examples discussed herein, mechanical testing and microstructural characterization are performed on as-fabricated samples at various test temperatures, as well as following long term thermal exposure. Mechanical test coupons are machined from printed coupons according to the ASTM E8 standard with a 0.25 in. gage diameter. For mechanical testing at elevated temperatures ranging from 150 to 400° C., a temperature ramp rate of 10° C./min is applied, and samples are held at temperature for 30 minutes prior to testing to allow for thermal equilibration. Additional samples are pre-conditioned for 200 hours at 400° C. using a resistance furnace, and then tested at the same temperature. As-atomized powder samples are also pre-conditioned using the same procedure for characterization by X-ray diffraction. Vickers hardness testing is performed on both as-fabricated and thermally exposed samples. To achieve a representative sampling of the microstructure, a 5 kg load with a 10 s dwell time is used, and measurements are averaged over 5 indents. Smaller indentations, using a 100 g load with a 13 s dwell time, also are used to locally probe microstructural regions. In some such examples, data are averaged over 10 indents.

Microscopy and X-ray Diffraction—Microstructures are first characterized by scanning electron microscopy (SEM) using both a Hitachi S-4800 Field Emission Gun (FEG)-SEM and Zeiss EVO LS15 on samples tested and heat treated at the temperatures listed above. Elemental distribution is mapped by energy dispersive spectroscopy (EDS) methods in the Hitachi S-4800. X-ray diffraction (XRD) data is collected on the gas atomized metal powder and additively manufactured samples in the as-fabricated and thermally exposed conditions using a PANalytical Empyrean instrument configured with a Bragg-Brentano geometry. Cu-Kα radiation is used (45 kV and 40 mA) and incident and diffracted beam optics included programmable divergent slits, anti-scattering slits and a PIXcel detector. Data are collected between 15 and 120 degrees 2θ with a step size of 0.026 degrees and a dwell time of 100 s. Aberration-corrected scanning transmission electron microscopy (AC-STEM) also is used to characterize the microstructure of the as-fabricated and thermally exposed material. Disks, 3 mm in diameter, is prepared by grinding and electropolishing using a Struers A/S TenuPol dual-jet electropolisher. The foils are then characterized using a JEOL 2200FS microscope outfitted with a CEOS GmbH aberration corrector. The instrument also is used to collect STEM-EDS spectra.

Computations—Computer coupling of phase diagrams and thermo-chemistry, e.g., the CALPHAD approach is used to aid understanding of the as-solidified and thermally exposed microstructure. In this approach, the Gibbs energy of individual phases is modeled based on crystal structure, defect type and phase chemistry. The model parameters are obtained through a procedure that aims at reproducing the experimentally assessed phase equilibria and thermodynamic properties by the model-calculated ones. The thermodynamic database, i.e., a compilation of Gibbs energy functions of individual phases, is modeled in sequence from unary, binary and ternary. The Gibbs energy functions of the three unary systems Al, Ce and Ni is adopted from the SGTE (Scientific Group Thermodata Europe) database compiled by Dinsdale. The Gibbs energy functions of phases in the three constituent binaries is adopted from Al—Ni, Al—Ce, and Ce—Ni energy functions. The Gibbs energy functions of phases in the Al-rich region of the Al—Ce—Ni system is obtained using thermodynamic modeling of an alloy embodiment according to the present disclosure.

Example 1

In this example, an Al—Ce—Ni alloys with a nominal composition of 9 wt % Ce, 4 wt % Ni, and a balance of Al was produced by alloying in a gas fired furnace in a 250 g SiC crucible using Argon as the cover gas. Alloying elements were certified to at least 99.6% purity. Impurity content of silicon was less than 0.10%, and iron less than 0.15%. Cast ingots were then Nitrogen atomized (Argon was used as the initial melt cover gas). The resulting powder was sieved for a 20-63 μm size distribution. Additive manufacturing was performed using a Concept Laser M2 laser powder bed fusion system.

The actual composition of the alloy was then measured using inductively coupled plasma. Results are shown in Table 1.

TABLE 1

Composition of Al—Ce—Ni Alloy, in wt %.

| Element | | | | | | | | |
|---|---|---|---|---|---|---|---|---|
| Al | Ce | Cu | Fe | Mg | Mn | Ni | Si | Zr |
| wt % 84.9 | 10.5 | 0.0059 | 0.18 | 0.013 | 1.18 | 3.09 | 0.118 | <0.001 |

The Cu, Fe, Mg, Si, and Zr content observed represents trace impurities in the prepared alloy. Mn content of above 1 wt % was observed in some embodiments.

Example 2

Figure 1B:
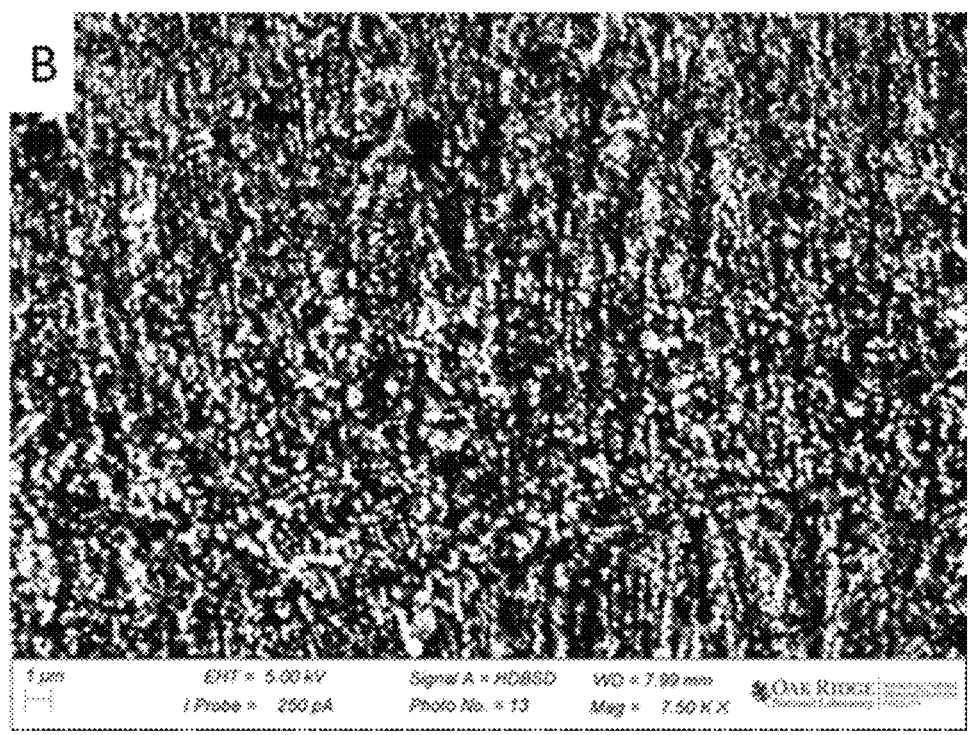

Test coupons of the alloy shown in Table 1 were manufactured with a Concept Laser M2 LPBF system. Tensile tests were performed on coupons in both the as-fabricated condition and following Hot Isostatic Pressing ("HIP") at 400° C., 200 MPa for 6 hours. FIG. 1A shows a representative micrograph of the microstructure of the alloy in the as-fabricated condition. FIG. 1B shows a representative micrograph of the microstructure of the alloy following HIP. Tests were conducted at sample temperatures of ambient temperature, 150° C., 200° C., 250° C., 300° C., and 400° C.

Figure 2:
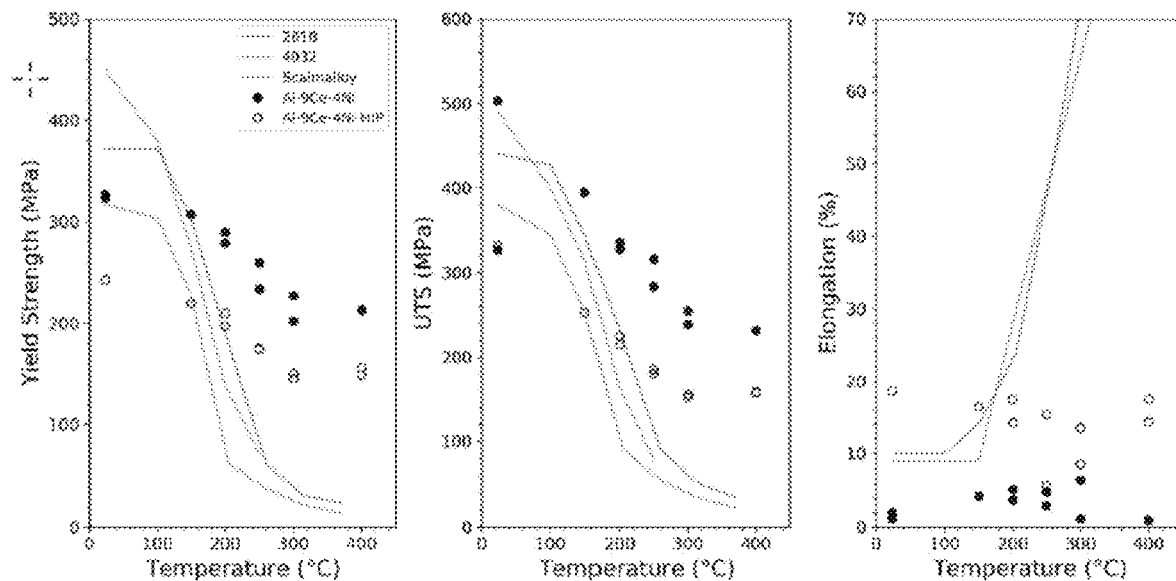
FIG. 2 shows the compared yield strength, ultimate tensile strength, and elongation data for an Al—Ce—Ni alloy according to embodiments disclosed herein in both the as-fabricated and hot isostatic pressed condition, wherein the data was measured at ambient temperature, 150° C., 200° C., 250° C., 300° C., and 400° C., and plotted in comparison to conventional 2618 Aluminum, 4032 Aluminum, and Scalmalloy data.

The results of the mechanical testing are summarized in FIG. 2. The mechanical test results are compared to two peak aged wrought Al alloys (2618 and 4032) as well as Scalmalloy, which is an Al—Sc alloy used in additive manufacturing. At ambient temperature, the yield strength of the Al—Ce—Ni alloy tends to be lower than that of wrought alloys. However, at high temperatures, the Al—Ce—Ni alloy retains its strength much better than the benchmark alloys. The HIP process tends to lower the overall strength of the Al—Ce—Ni alloy, but also increases the maximum tensile elongation. Even in the HIP condition, the strength of the alloy at temperatures above 200° C. significantly outperforms the benchmark alloys.

Example 3

In this example, the composition of the matrix and intermetallic phases was studied using Atom Probe Tomography (APT). APT is an atomic resolution level characterization technique that allows for compositional analysis of different phases and/or regions of an alloy sample. APT specimens were prepared according to the following methodology. Wedges were lifted out, mounted on Si microtip array posts, sharpened using a 30 kV Ga$^+$ ion beam, and cleaned using a 2 kV Ga$^+$ ion beam. APT experiments were run using a CAMECA LEAP 4000XHR in voltage and laser modes with a 25-70K base temperature, 30% pulse fraction (voltage mode), laser energy of 35 pJ (laser mode), detection rate of 0.25-0.5%, and a 200 kHz pulse repetition rate. The APT results were reconstructed and analyzed using CAMECA's interactive visualization and analysis software (IVAS 3.8). Compositions of the precipitate phases and matrix were extracted from the plateau regions of proximity histograms.

Figure 3:
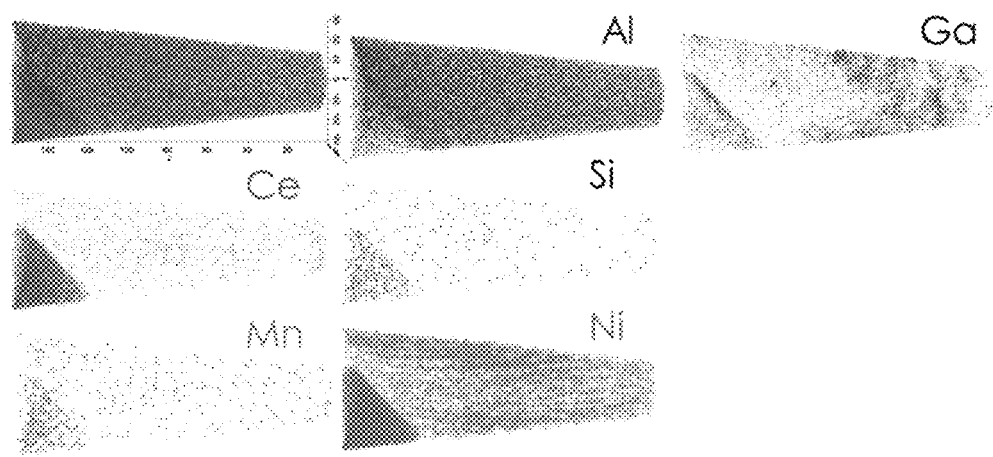
FIG. 3 is a plot of atom probe tomography results from an Al—Ce—Ni alloy according to embodiments herein, showing the relative concentrations of Ce, Mn, Al, Si, Ni, and Ga in the aluminum matrix and intermetallic phases.
Figure 4:
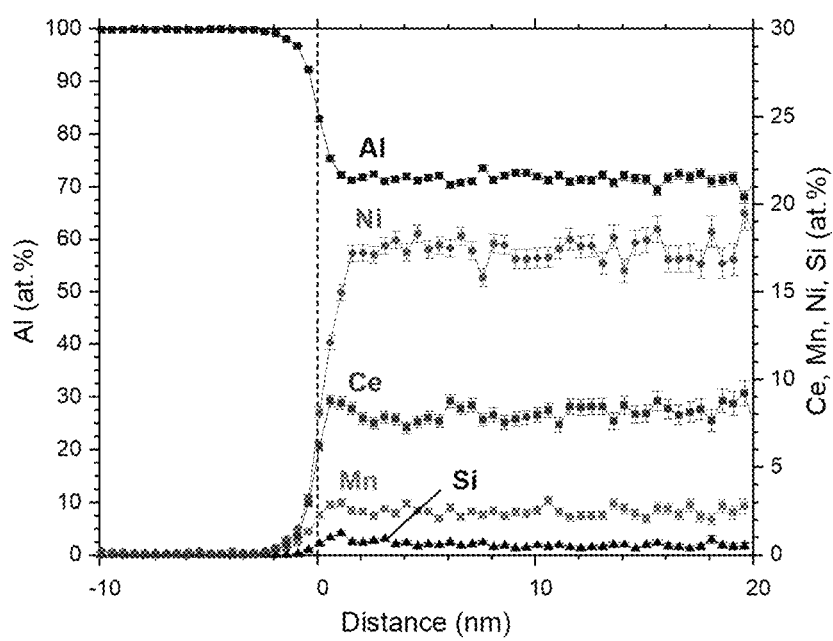
FIG. 4 is a plot of the atomic concentration of alloy elements Al, Ce, and Ni, as well as levels of Si and Mn content from the atom probe tomography results of FIG. 3, shown in atomic percent.

APT samples were prepared for an Al—Ce—Ni alloy having the composition shown in Table 1. Results are shown in FIGS. 3 and 4. FIG. 3 shows an aluminum matrix region towards the tip of the wedge having Ni and Zr content in solid solution, and intermetallic phases comprising elevated levels of Ni and Ce. FIG. 4 shows the concentrations of alloy elements Al, Ce, and Ni, as well as impurity elements Mn and Si, in atomic percent.

Example 4

Figure 5A:
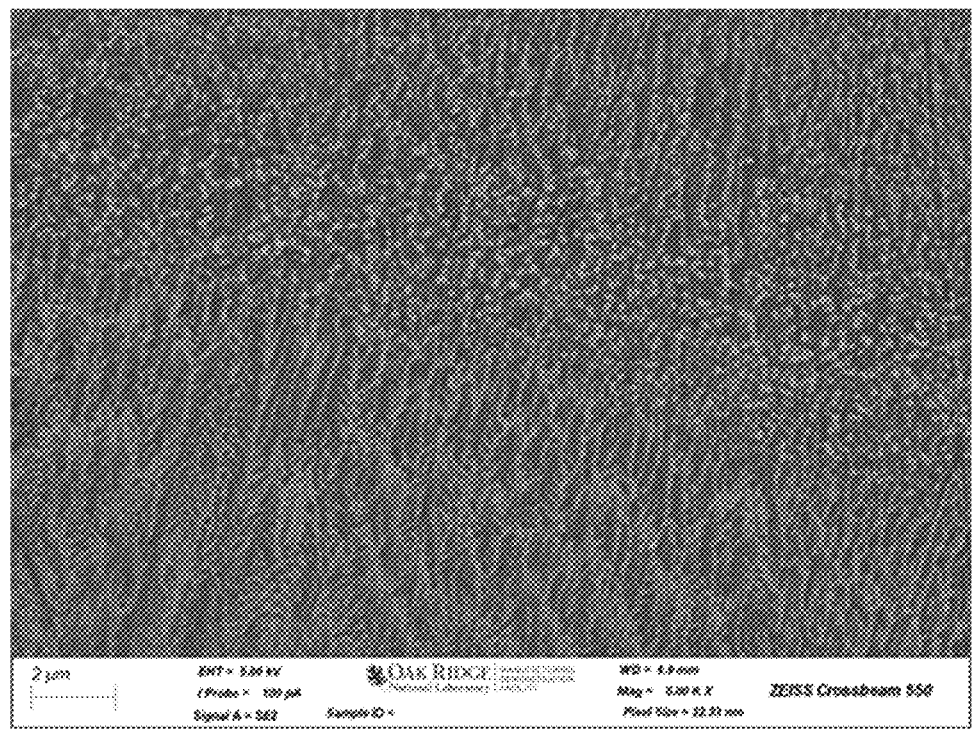
FIGS. 5A-5C are representative micrographs of the microstructure of a component fabricated according to additive manufacturing methods disclosed herein from an Al—Ce—Ni alloy according to embodiments disclosed herein, wherein the microstructures resulting from varying manufacturing methods are shown.
Figure 5B:
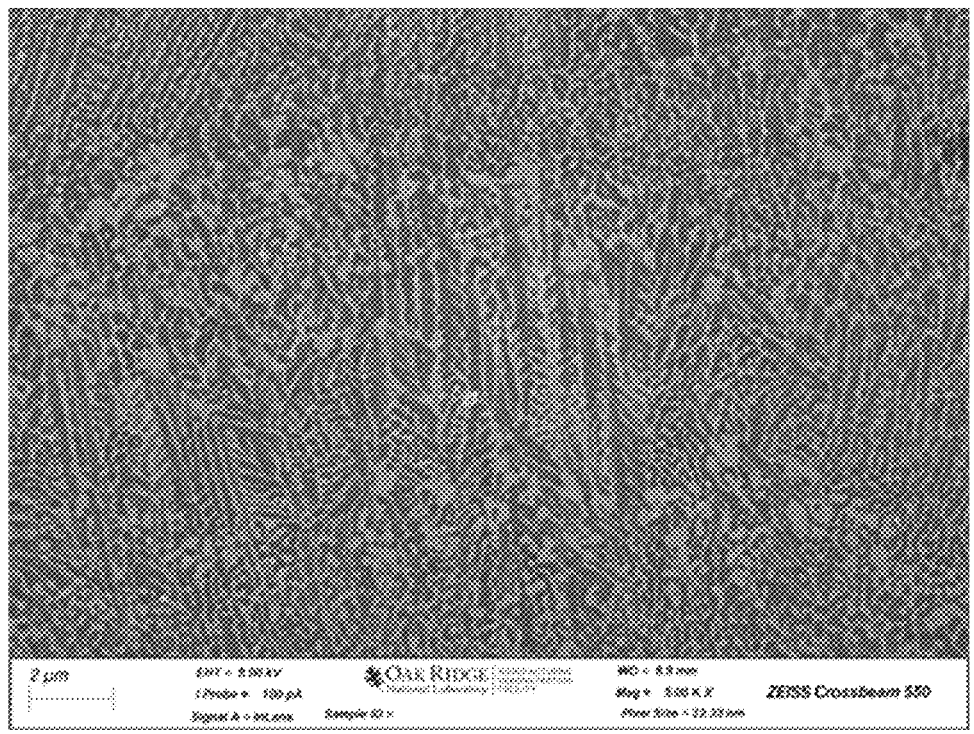
Figure 5C:
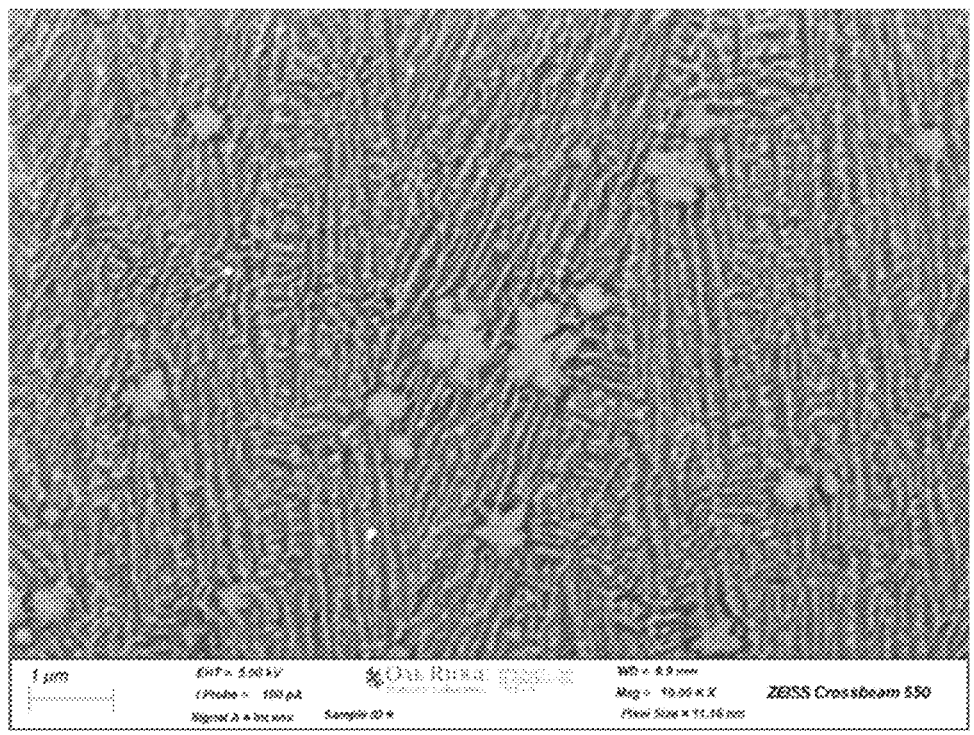

In this example, samples were prepared from an Al—Ce—Ni alloy with the composition shown in Table 1, using a Concept Laser M2 LPBF system and an EOS M290 system to fabricate the samples. FIG. 5A shows a representative micrograph of the microstructure of a sample fabricated using the Concept Laser M2 LPBF system. FIG. 5B shows a representative micrograph of the microstructure of a sample fabricated using the EOS M290. FIG. 5C shows a micrograph of the microstructure of the Al—Ce—Ni—Mn alloy fabricated using the EOS M290 and containing Mn-rich precipitate phases. These phases are not present in the samples prepared using the Concept Laser M2 LPBF system, suggesting that under the processing conditions used, the Mn content of the alloy is retained in solid solution in the Al matrix phase.

Example 5

Figure 6:
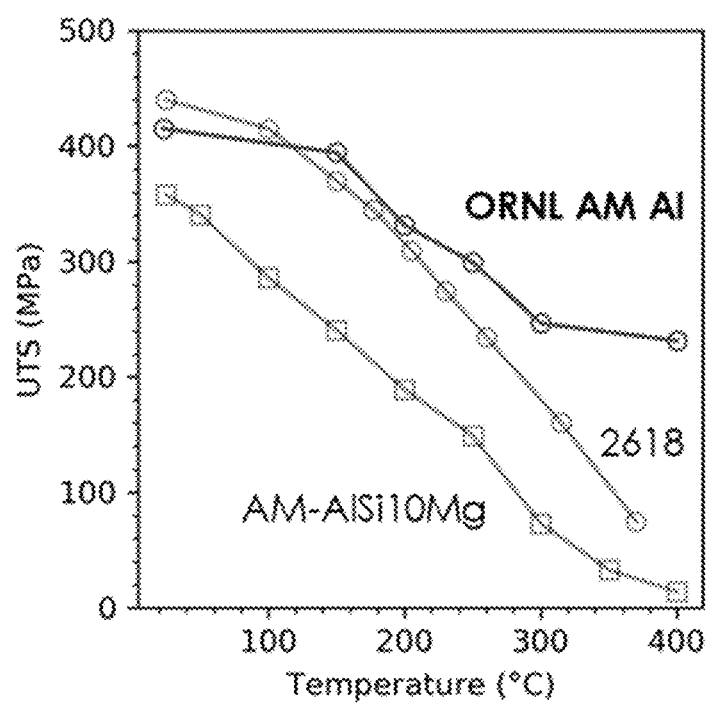
FIG. 6 is a comparative plot of the ultimate tensile strength data of samples additively manufactured according to methods disclosed herein from an Al—Ce—Ni alloy according to embodiments disclosed herein, wherein the data was measured at ambient temperature, 150° C., 200° C., 250° C., 300° C., and 400° C. and is plotted against ultimate tensile strength data for additively manufactured 2618 aluminum and Al-Si10-Mg.

In this example, tensile test coupons were prepared from an Al—Ce—Ni alloy with the composition shown in Table 1, in the as-fabricated condition. The performance of the additively manufactured Al—Ce—Ni alloy was compared to that of additively manufactured 2618 aluminum and additively manufactured Al-Si10-Mg. Tensile testing was conducted on the prepared coupons at sample temperatures of ambient temperature, 150° C., 200° C., 250° C., 300° C., and 400° C. The results of the mechanical testing are shown in FIG. 6. The mechanical test results are compared against 2618 aluminum and additively manufactured AlSi10Mg. Compared to the baseline alloys, the Al—Ce—Ni alloy demonstrated greater retention of ultimate tensile strength at temperatures over 200° C.

Example 6

In this example, samples were prepared from the Al—Ce—Ni alloy of the composition listed in Table 1. Aberration-corrected scanning transmission electron microscopy (AC-STEM) was used to characterize the microstructure of the material. Disks, 3 mm in diameter, were prepared by grinding and electropolishing using a Struers NS TenuPol dual-jet electropolisher. The foils were then characterized using a JEOL 2200FS microscope outfitted with a CEOS GmbH aberration corrector.

Figure 7B:
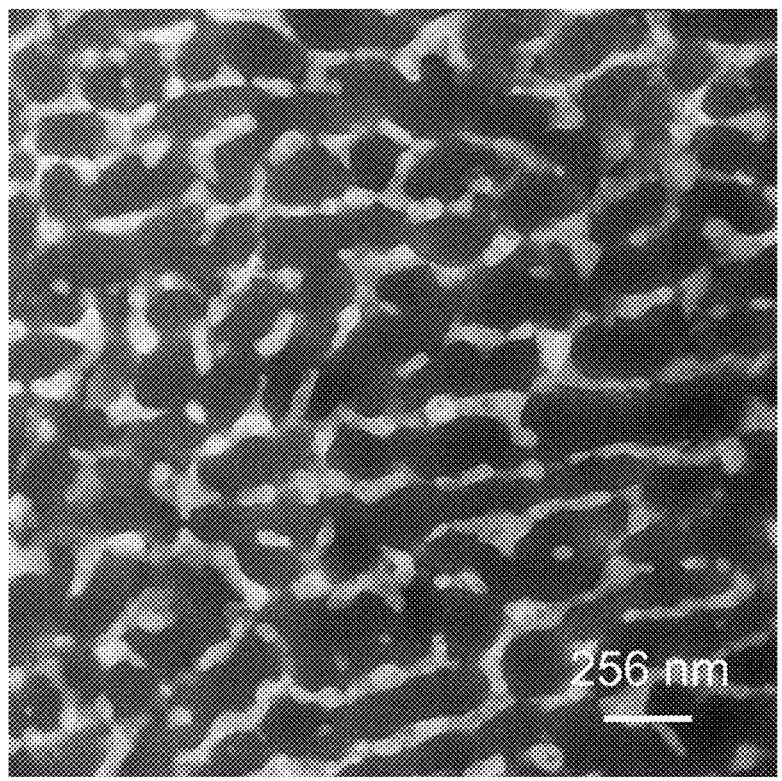

FIGS. 7A and 7B show the microstructure of the Al—Ce—Ni alloy. The aluminum matrix phase of the alloy is shown as dark, cellular or nodular regions. Two intermetallic phases are shown. A first, intermetallic phase is shown as a brighter, lattice-like structure separating the cellular or nodular regions of the aluminum matrix phase. A second intermetallic phase is shown as light grey spherical formations. The first intermetallic phase contains a higher level of Ce than the second intermetallic phase.

Figure 8A:
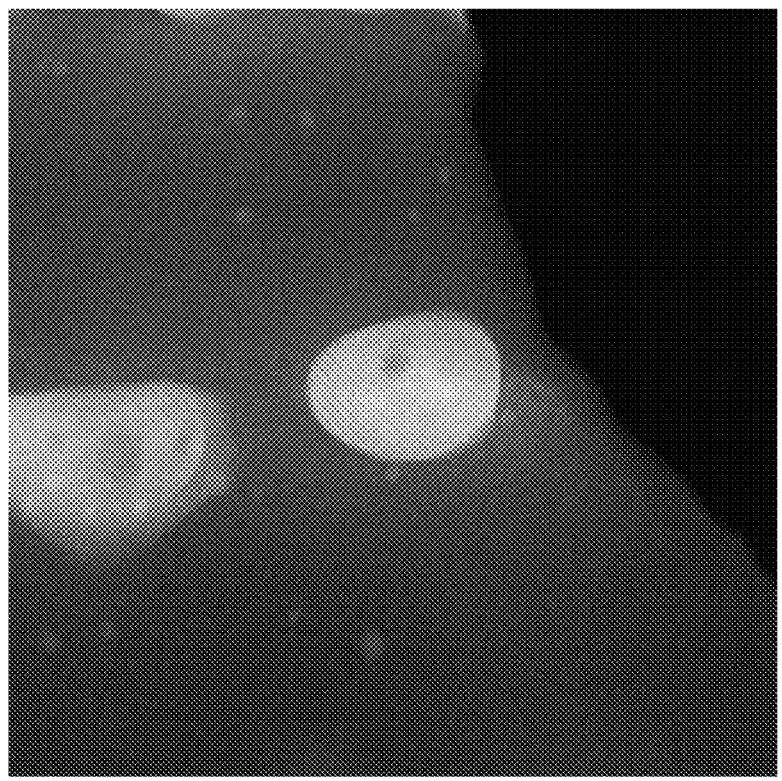
FIGS. 8A-8C show high magnification scanning transmission electron microscopy micrographs of an Al—Ce—Ni alloy according to embodiments disclosed herein, focusing on regions of the brighter intermetallic from FIGS. 7A and 7B.
Figure 8B:
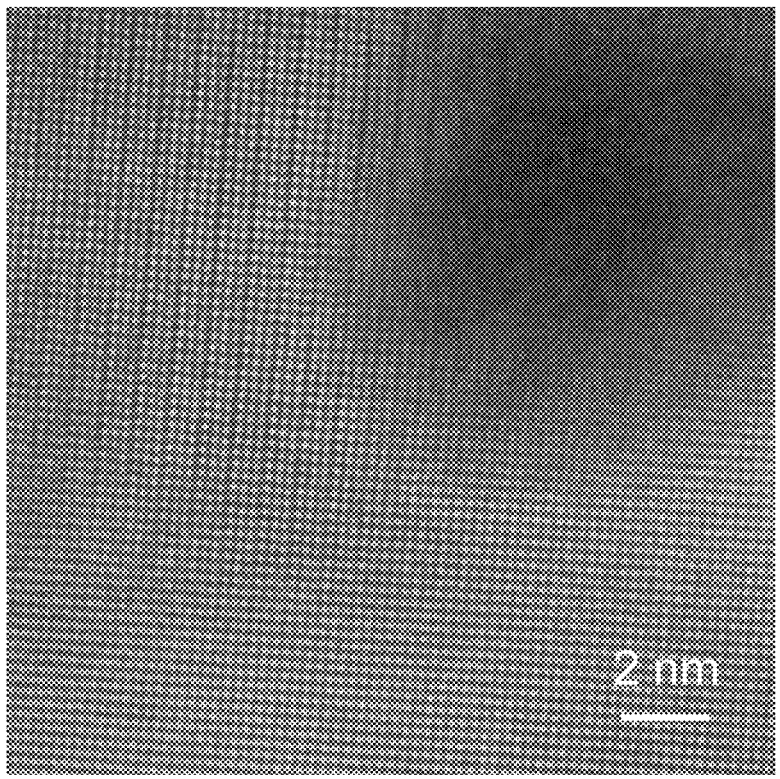
Figure 8C:
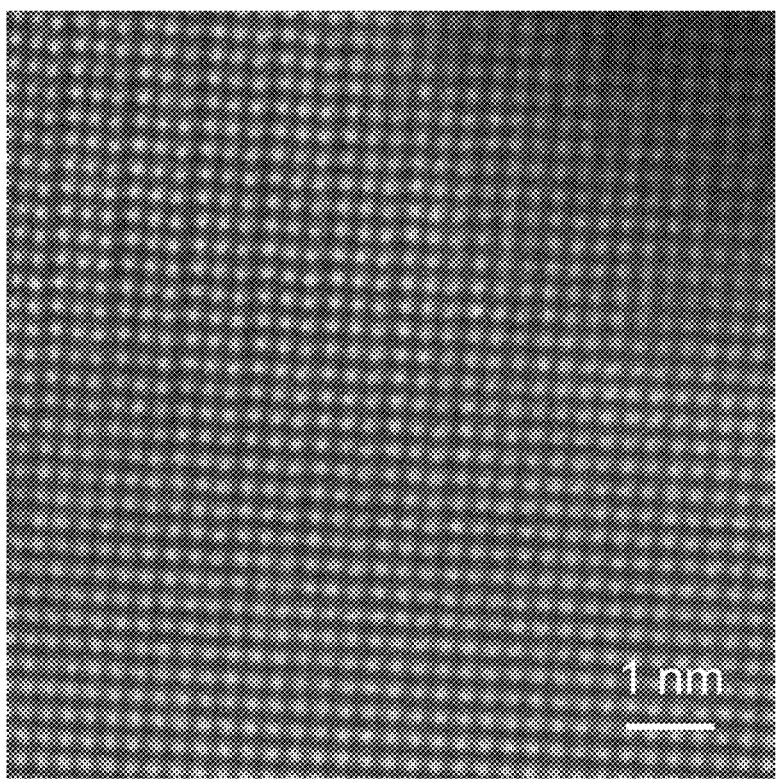

FIGS. 8A through 8C show a high magnification view of an exemplary first intermetallic phase particle. FIG. 8A shows two isolated regions of the first intermetallic phase against an aluminum matrix region. FIGS. 8B and 8C show an atomic resolution level view of the first intermetallic phase particle. FIG. 8C shows a spacing between atomic columns of 0.27 nm.

Figure 9A:
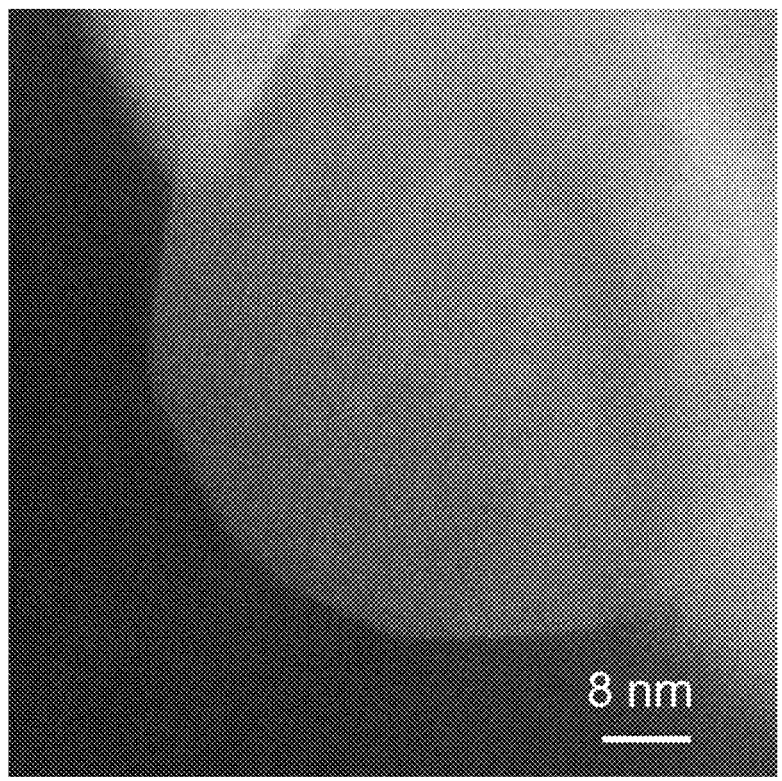
FIGS. 9A-9C show high magnification scanning transmission electron microscopy micrographs of an Al—Ce—Ni alloy according to embodiments disclosed herein, focusing on regions of the darker intermetallic phase shown in FIGS. 7A and 7B.
Figure 9B:
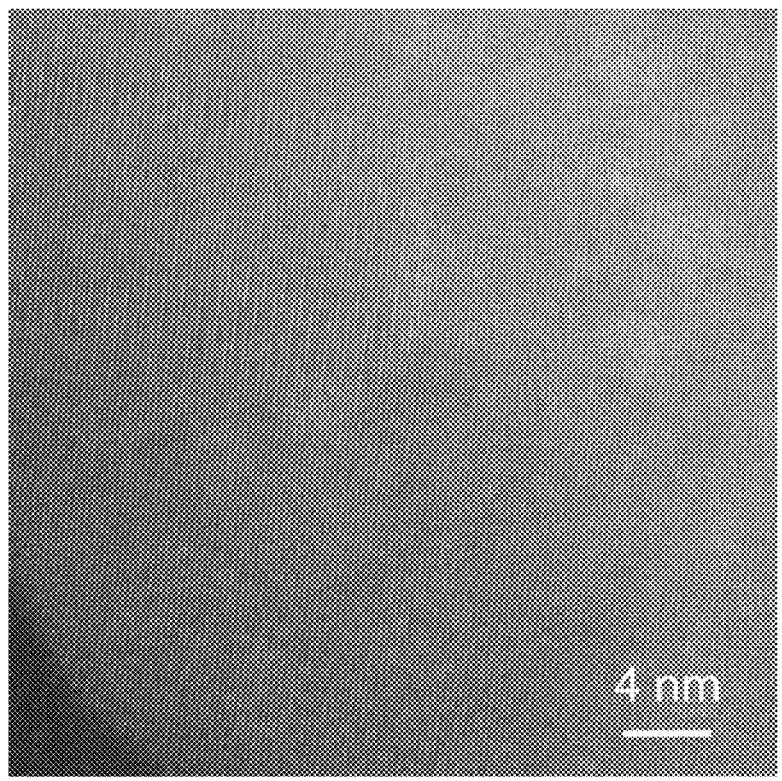
Figure 9C:
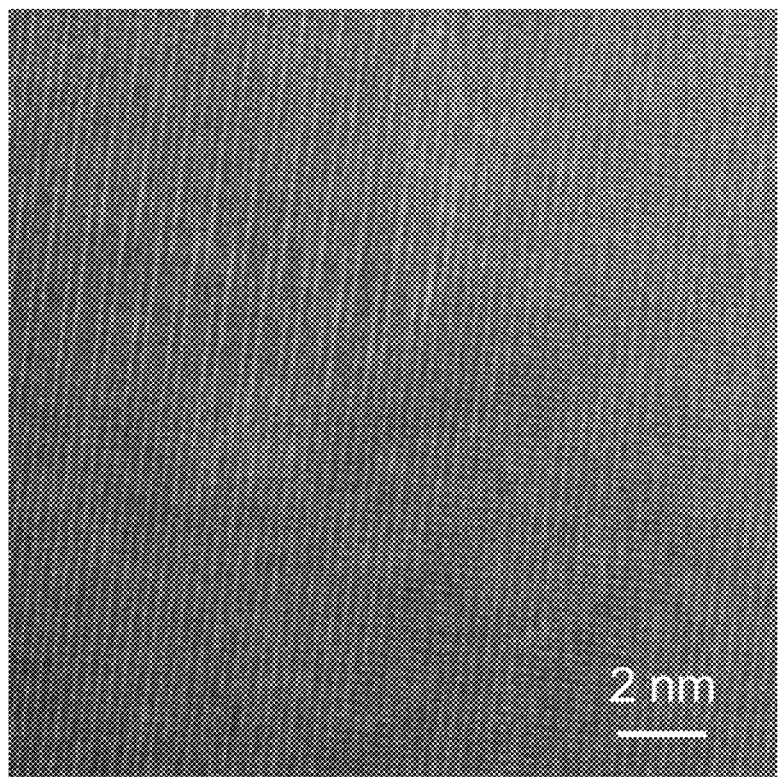

FIGS. 9A through 9C show a high magnification view of an exemplary second intermetallic phase particle. FIG. 9A shows the secondary intermetallic phase particle against an aluminum matrix region and a first intermetallic phase region. FIGS. 9B and 9C show an atomic resolution level view of the second intermetallic phase particle.

Figure 10:
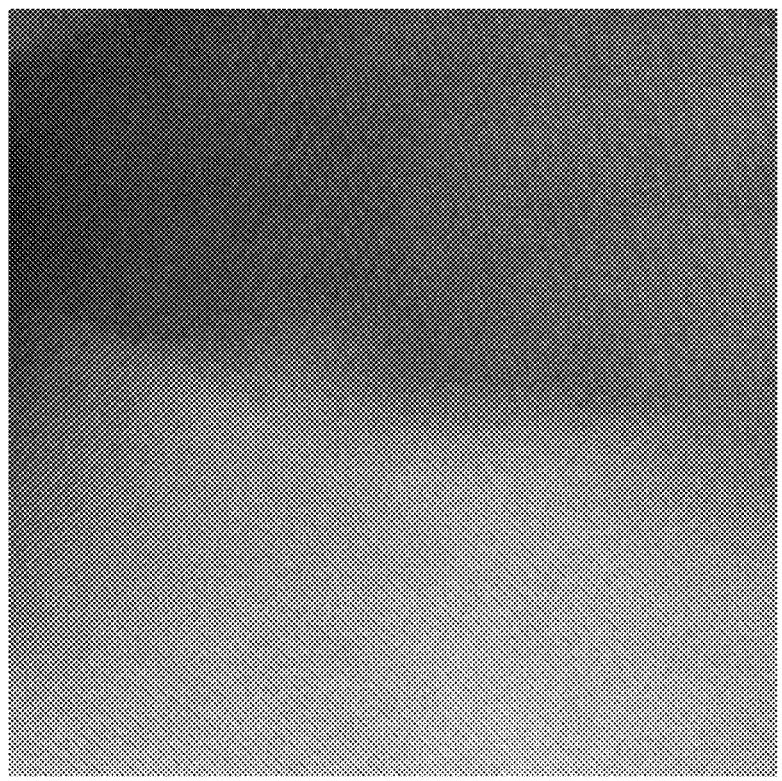
FIG. 10 shows a high magnification scanning transmission electron microscopy micrograph of an Al—Ce—Ni alloy according to embodiments disclosed herein, focusing on the interface between a first, brighter intermetallic and a second darker intermetallic.

FIG. 10 shows an interface between the first and the second intermetallic phase.

Example 7

In this example, tensile specimens were prepared from an Al—Ce—Ni alloy with the composition shown in Table 1, following a 2 hour anneal at 450° C. Samples were cut according to the ASTM E8 standard. Samples were heated to 300° C., 325° C., 350° C., and 400° C. and held under constant tensile stresses of as listed in Table 2, and the deformation of the samples over time was measured. From the deformation data of the samples over time, the strain rate for the samples under each load was calculated and plotted against similar creep strain values under given loads for ACMZ aluminum (Al-6Cu-0.2Mn-0.1Zr) RR350 Aluminum (Al-5Cu-1.2Ni-0.3Co-0.2Mn-0.2Zr), two aluminum alloys designed for high temperature performance assessment.

TABLE 2

Creep Testing Test Stresses

| Test Temperature | Stress 1 (MPa) | Stress 2 (MPa) | Stress 3 (MPa) | Stress 4 (MPa) | Stress 5 (MPa) | Stress 6 (MPa) |
| --- | --- | --- | --- | --- | --- | --- |
| 300° C. | 40 | 50 | 60 | 70 | 80 | 90 |
| 325° C. | 40 | 50 | 60 | X | X | X |
| 350° C. | 40 | 50 | 55 | 60 | X | X |
| 400° C. | 10 | 15 | 20 | X | X | X |

Figure 11:
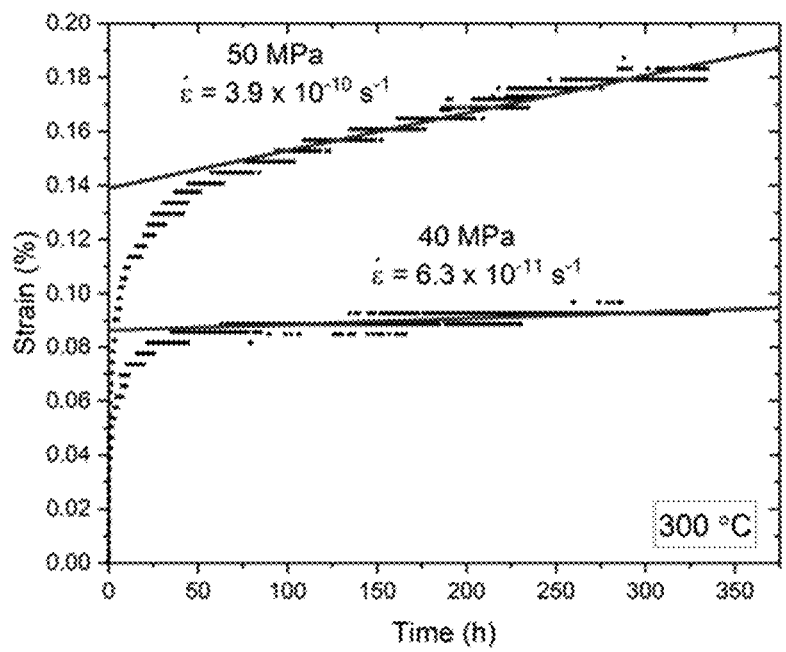
FIG. 11 shows the measured deformation of samples of the Al—Ce—Ni alloy at 300° C. under loads of 40 MPa and 50 MPa, plotted against the time under load in hours, wherein the alloy shows a strain rate of $6.3 \times 10^{-11}$ s$^{-1}$ under a 40 MPa load, and a strain rate of $3.9 \times 10^{-10}$ s$^{-1}$ under a 50 MPa load.

FIG. 11 shows the measured deformation of samples of the Al—Ce—Ni alloy at 300° C. under loads of 40 MPa and 50 MPa, plotted against the time under load in hours. The steady-state strain rate was calculated once the sample had reached an approximately linear deformation rate. Under a 40 MPa load, the strain rate was $6.3 \times 10^{-11}$ $s^{-1}$. Under a 50 MPa load, the strain rate was $3.9 \times 10^{-10}$ $s^{-1}$.

Figure 12:
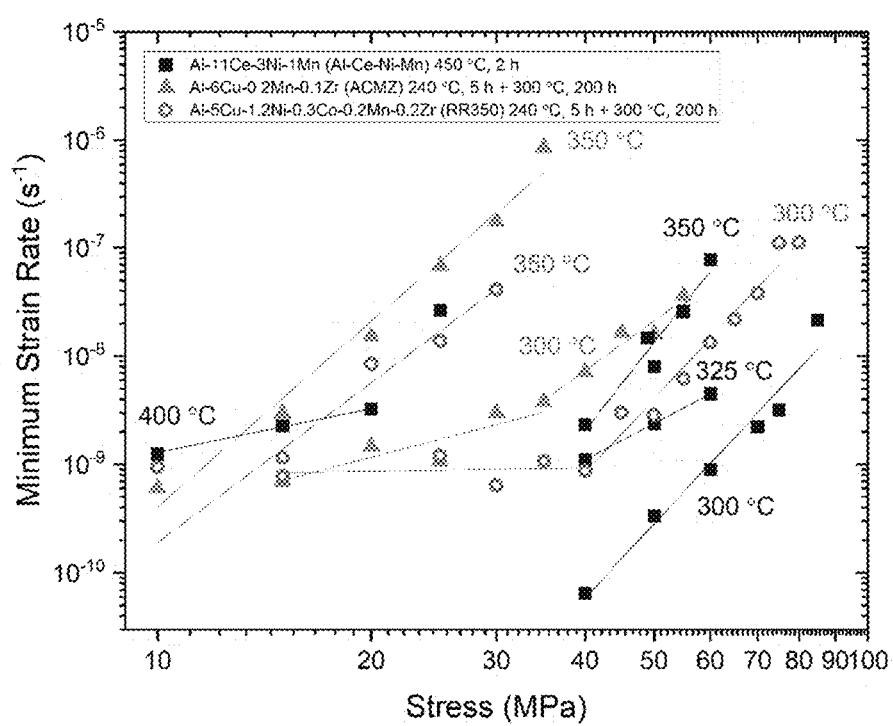
FIG. 12 shows the strain rates for the Al—Ce—Ni alloy at temperatures of 300° C., 325° C., 350° C., and 400° C. as a function of the load applied plotted against data for ACMZ aluminum at 300° C. and 350° C. and RR350 Aluminum tested at 300° C. and 350° C. under various testing stresses.

FIG. 12 shows the strain rates for the Al—Ce—Ni alloy at temperatures of 300° C., 325° C., 350° C., and 400° C. as a function of the load applied. This data is plotted against data for ACMZ aluminum at 300° C. and 350° C. and RR350 Aluminum at 300° C. and 350° C. As shown in FIG. 12, at a test temperature of 300° C., the Al—Ce—Ni alloy shows a lower strain rate at all measured loads than exhibited by either ACMZ aluminum or RR350 aluminum. At a test temperature of 350° C., the Al—Ce—Ni alloy loaded to a test stress of between 40 and 60 MPa demonstrates strain rates equivalent to those observed at much lower test stresses for both ACMZ and RR350 aluminum. At a test temperature of 400° C. and test stresses of 10 MPa to 20 MPa, the Al—Ce—Ni alloy demonstrates strain rates comparable to or lower than those observed at 350° C. under identical loading conditions. Thus, the Al—Ce—Ni alloy can be shown to have superior creep behavior to known high-temperature aluminum alloys ACMZ aluminum and RR350 aluminum.

In view of the many possible embodiments to which the principles of the present disclosure may be applied, it should be recognized that the illustrated embodiments are only preferred examples and should not be taken as limiting the scope of the present disclosure. Rather, the scope is defined by the following claims. We therefore claim as our invention all that comes within the scope and spirit of these claims.

We claim:

1. An alloy composition, comprising:
   greater than 0 wt % to 35 wt % cerium;
   greater than 1 wt % to 35 wt % nickel;
   a minor alloying element that is manganese, wherein the manganese is present in an amount ranging from greater than 0 wt % to 3 wt %; and
   a balance of aluminum;
   wherein, when the alloy composition is additively manufactured, the amount of cerium and amount of nickel present in the alloy composition are sufficient to cause the formation of an aluminum-based matrix phase comprising isolated features having an average length of 50 nm to 50 μm and one or more intermetallic phases selected from $Al_{23}Ni_6Ce_4$, $Al_{11}Ce_3$, $Al_7Ni_2Ce$, $Al_{20}Mn_2Ce$ or $Al_3Ni$, wherein at least one of the one or more intermetallic phases forms lattice-like structures between the aluminum-based matrix, with a thickness ranging from 10 nm to 100 nm; and
   wherein more than half of the manganese amount in the alloy is in solid solution in the aluminum-based matrix phase and provides solid solution strengthening to the aluminum-based matrix phase when the alloy is additively manufactured.

2. The alloy composition of claim 1, further comprising one or more of vanadium, titanium, hafnium, erbium, or scandium, wherein the vanadium, titanium, hafnium, erbium, or scandium is present in an amount less than 1 wt %, individually.

3. The alloy composition of claim 1, wherein the cerium is present in an amount ranging from 2 wt % to 25 wt %.

4. The alloy composition of claim 1, wherein the cerium is present in an amount ranging from 4 wt % to 20 wt %.

5. The alloy composition of claim 1, wherein the nickel is present in an amount ranging from 2 wt % to 25 wt %.

6. The alloy composition of claim 1, wherein the nickel is present in an amount ranging from 4 wt % to 20 wt %.

7. The alloy composition of claim 1, wherein the alloy composition comprises 9 wt % cerium, 4 wt % nickel, greater than 0 wt % to less than 1 wt % manganese, trace impurities, and the balance of aluminum.

8. The alloy composition of claim 1, wherein the alloy composition comprises 10 wt % cerium, 3 wt % nickel, 1 wt % manganese, trace impurities, and the balance of aluminum.

9. A fabricated object comprising the alloy composition of claim 1, wherein the fabricated object comprises a heterogeneous microstructure having (i) the aluminum-based matrix phase; and (ii) the at least one intermetallic phase forming the lattice-like structures.

10. The fabricated object of claim 9, wherein the heterogenous microstructure further comprises at least one precipitate phase.

11. The fabricated object of claim 10, wherein the at least one precipitate phase is one or more of $Al_3Zr$, $Al_3V$, $Al_3Ti$, $Al_3Hf$, $Al_3Er$, and $Al_3Sc$.

12. The fabricated object of claim 10, wherein the at least one precipitate phase contains at least a portion of the manganese.

13. The fabricated object of claim 9, wherein the aluminum-based matrix phase further comprises zirconium in solid solution.

14. The fabricated object of claim 9, wherein the intermetallic phase comprises at least one of $Al_{23}Ni_6Ce_4$, $Al_{11}Ce_3$, $Al_7Ni_2Ce$, or $Al_3Ni$.

15. The alloy of claim 1, wherein the alloy further comprises up to 3 wt % iron, up to 2 wt % magnesium, up to 2 wt % zirconium, up to 1 wt % silicon, up to 5 wt % chromium, or any combination thereof.

\* \* \* \* \*